(12) United States Patent
Lee

(10) Patent No.: US 8,036,687 B2
(45) Date of Patent: Oct. 11, 2011

(54) METHOD AND APPARATUS FOR SUPPORTING SHORT-MESSAGING IN A COMMUNICATION NETWORK

(75) Inventor: Susan Suh-Jen Lee, Naperville, IL (US)

(73) Assignee: Alcatel Lucent, Paris (FR)

( * ) Notice: Subject to any disclaimer, the term of this patent is extended or adjusted under 35 U.S.C. 154(b) by 1716 days.

(21) Appl. No.: 10/376,378

(22) Filed: Feb. 28, 2003

(65) Prior Publication Data

US 2004/0023676 A1 Feb. 5, 2004

Related U.S. Application Data

(60) Provisional application No. 60/360,317, filed on Feb. 28, 2002.

(51) Int. Cl.
*H04W 4/00* (2009.01)
(52) U.S. Cl. .......... 455/466; 455/412.1; 455/414.1; 455/414.2; 455/433; 455/452.2; 370/328; 370/329; 370/349; 709/227
(58) Field of Classification Search ............ 455/466, 455/403, 550.1, 422.1, 433, 437, 439, 428, 455/427, 412.1, 412.2, 414.1, 414.2, 452.2; 379/328, 349; 370/328–338, 349; 709/227
See application file for complete search history.

(56) References Cited

U.S. PATENT DOCUMENTS

| | | | | | |
|---|---|---|---|---|---|
| 5,878,397 | A | * | 3/1999 | Stille et al. | 455/466 |
| 6,014,560 | A | * | 1/2000 | Kramer | 455/414.4 |
| 6,052,591 | A | * | 4/2000 | Bhatia | 455/445 |
| 6,195,347 | B1 | * | 2/2001 | Sehgal | 370/354 |
| 6,334,053 | B1 | * | 12/2001 | Halonen | 455/412.1 |
| 6,690,942 | B2 | * | 2/2004 | Vikman et al. | 455/466 |
| 6,825,955 | B1 | * | 11/2004 | Shibata | 358/402 |
| 7,720,492 | B2 | * | 5/2010 | Becker et al. | 455/466 |
| 2001/0046234 | A1 | * | 11/2001 | Agrawal et al. | 370/402 |
| 2002/0077086 | A1 | * | 6/2002 | Tuomela et al. | 455/414 |
| 2003/0028524 | A1 | * | 2/2003 | Keskar et al. | 707/3 |

FOREIGN PATENT DOCUMENTS

JP  2002-063087  * 2/2002

OTHER PUBLICATIONS

ITU-T Recommendation Q.957.1 (Jul. 1996), Series Q: Switching and Signalling, Digital subscriber Signalling System No. 1—Stage 3 description for supplementary services using DSS1, Stage 3 description for additional information transfer supplementary services using DSS 1: User-to-User Signalling (UUS).
ITU-T Recommendation Q.737.1 (Jun. 1997), Series Q: Switching and Signalling, Specifications of Signalling System No. 7—ISDN supplementary services, Stage 3 description for additional information transfer supplementary services using Signalling System No. 7: User-to-User Signalling (UUS).
RCR STD-28: Personal Handy Phone System—ARIB Standard—12 selected pages (publication unknown but believed to be at least as early as Mar. 28, 2002).

* cited by examiner

*Primary Examiner* — Ajit Patel
*Assistant Examiner* — Khai M Nguyen
(74) *Attorney, Agent, or Firm* — Fay Sharpe LLP

(57) ABSTRACT

This invention relates to a method and apparatus for short-messaging in a communication network. More particularly, the invention is directed to an improved method for short-messaging which allows for a service that is adaptable to different communication networks and complies with accepted standards in the industry. The system utilizes a unique UUI format that allows for improved short-messaging service and short-messaging service-based information retrieval.

12 Claims, 35 Drawing Sheets

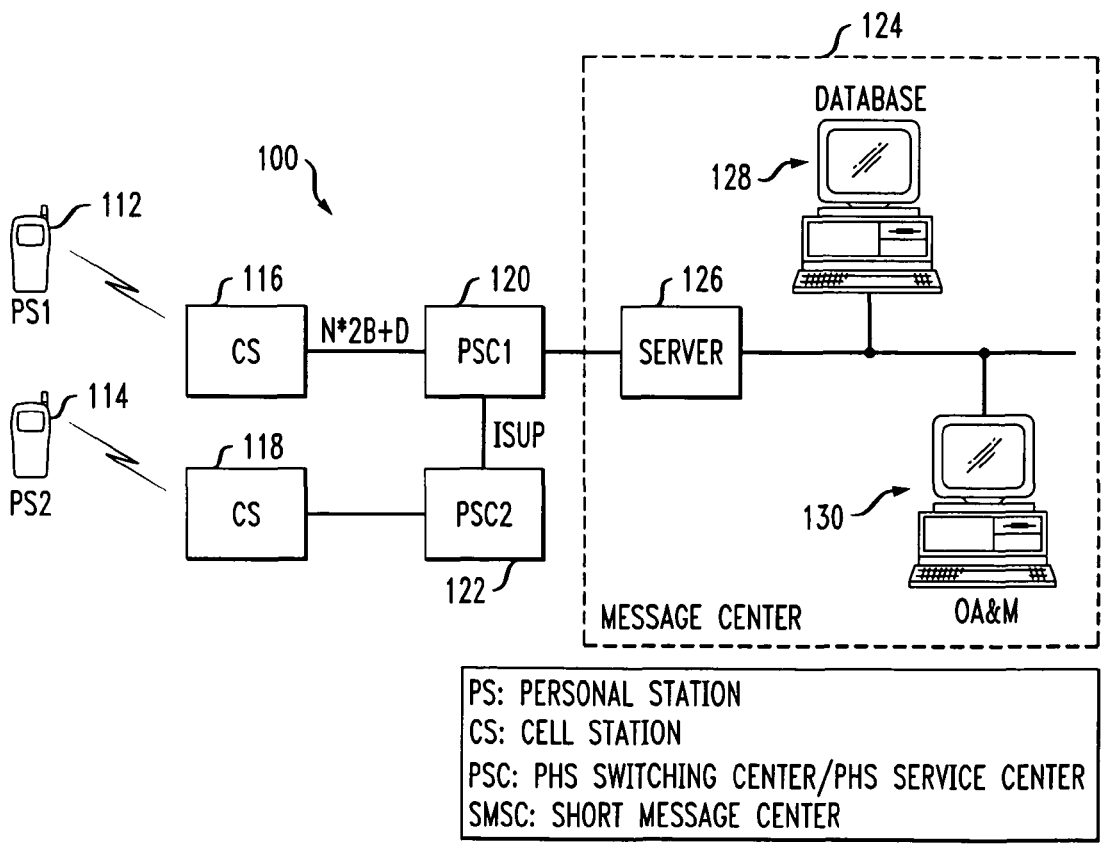

FIG. 4 /⁓400

| | 8 | 7 | 6 | 5 | 4 | 3 | 2 | 1 | |
|---|---|---|---|---|---|---|---|---|---|
| 1 | User-to-User information element identifier ||||||||⁓402 |
| 2 | User-to-User content length ||||||||⁓404 |
| 3 | Protocol identifier ||||||||⁓406 |
| 4 | PHS system ||| 408 | UUS Application ID length ||||⁓410 |
| 5 | UUS Application ID ||||||||⁓412 |
| 6 | Ext. bit 414 | CgPN ind. 416 | CdPN ind. 418 | Reserved 420 | Acknowledge request 422 ||||  |
| 7 | Ext. bit 424 | Reserved 426 || Operation mode 428 ||| Priority 430 ||  |
| 8 | Data content length ||||||||⁓432 |
| 9 | Language code (#1) ||||||||⁓434 |
| 10 | Content length for language code ||||||||⁓436 |
| 11 | Data content |||||||| |
| ⋮ | ⋮ |||||||| |
| N | ⋮ |||||||| |
| N+1 | Language code (#2) ||||||||⁓438 |
| N+2 | Content length for language code ||||||||⁓440 |
| N+3 | Data content |||||||| |
| ⋮ | ⋮ |||||||| |
| ⋮ | ⋮ |||||||| |
| 131 | Data content |||||||| |

FIG. 5  /—500

| | 8 | 7 | 6 | 5 | 4 | 3 | 2 | 1 | |
|---|---|---|---|---|---|---|---|---|---|
| 1 | User-to-User information element identifier |||||||| ←502 |
| 2 | User-to-User content length |||||||| ←504 |
| 3 | Protocol identifier |||||||| ←506 |
| 4 | PHS system <u>508</u> |||| UUS Application ID length |||| ←510 |
| 5 | UUS Application ID |||||||| ←512 |
| 6 | Ext. bit <u>514</u> | CgPN ind. <u>516</u> | CdPN ind. <u>518</u> | Reserved* <u>520</u> | Acknowledge request <u>522</u> |||| |
| 7 | Ext. bit <u>524</u> | Reserved <u>526</u> || Operation mode <u>528</u> ||| Priority <u>530</u> || |
| 8 | 0 | Called party number information element identifier ||||||| ←532 |
| 9 | Length of called party number |||||||| ←534 |
| 10 | 1 | Type of number |||| Numbering plan identification ||| ←536 |
| 11 | 0 | Number digits (IA5 characters) ||||||| ←538 |
| ⋮ | ⋮ |||||||| |
| N | ⋮ |||||||| |
| N+1 | Data content length |||||||| |
| N+2 | Language code (#1) |||||||| |
| N+3 | Content length for language code |||||||| |
| N+4 | Data content |||||||| |
| ⋮ | ⋮ |||||||| |
| N+M | Language code (#2) |||||||| |
| N+M+1 | Content length for language code |||||||| |
| N+M+2 | Data content |||||||| |
| ⋮ | ⋮ |||||||| |
| 131 | Data content |||||||| |

FIG. 6 ⟋600

| | 8 | 7 | 6 | 5 | 4 | 3 | 2 | 1 |
|---|---|---|---|---|---|---|---|---|
| 1 | User-to-User information element identifier ||||||||
| 2 | User-to-User content length ||||||||
| 3 | Protocol identifier ||||||||
| 4 | PHS system |||| UUS Application ID length ||||
| 5 | UUS Application ID ||||||||
| 6 | Ext. bit | CgPN ind. 618 | CdPN ind. | Reserved | Acknowledge request ||||
| 7 | Ext. bit | Reserved ||| Operation mode || Priority ||
| 8 | 0 | Called party number information element identifier |||||||
| 9 | Length of calling party number ||||||||
| 10 | 0/1 | Type of number |||| Numbering plan identification |||
| 11 | 1 | Presentation indicator ||| Spare ||| Network screening indicator ||
| 12 | 0 | Number digits (IA5 characters) |||||||
| ⋮ | ⋮ ||||||||
| N | ⋮ ||||||||
| N+1 | Data content length ||||||||
| N+2 | Language code (#1) ||||||||
| N+3 | Content length for language code (#1) ||||||||
| N+4 | Data content ||||||||
| ⋮ | ⋮ ||||||||
| N+M | Language code (#2) ||||||||
| N+M+1 | Content length for language code (#2) ||||||||
| N+M+2 | Data content ||||||||
| ⋮ | ⋮ ||||||||
| 131 | Data content ||||||||

| | 8 | 7 | 6 | 5 | 4 | 3 | 2 | 1 | |
|---|---|---|---|---|---|---|---|---|---|
| 1 | User-to-User information element identifier ||||||||502 |
| 2 | User-to-User content length ||||||||504 |
| 3 | Protocol identifier ||||||||506 |
| 4 | PHS system ||| 708 | UUS Application ID length ||||510 |
| 5 | UUS Application ID ||||||||512 |
| 6 | Ext. bit | CgPN ind. | CdPN ind. | Reserved | Acknowledge request ||||
| 7 | Ext. bit | Reserved || Operation mode ||| Priority ||
| 8 | Data content length |||||||||
| 9 | Language code |||||||||
| 10 | Content length for language code |||||||||
| 11 | Data content (Acknowledge – mandatory) |||||||||
| 12 | Data content (Cause – optional) |||||||||

|   | 8 | 7 | 6 | 5 | 4 | 3 | 2 | 1 |
|---|---|---|---|---|---|---|---|---|
| 1 | colspan="8" | User-to-User information element identifier |
| 2 | User-to-User content length |||||||||
| 3 | Protocol identifier |||||||||
| 4 | PHS system |||| UUS Application ID length ||||
| 5 | UUS Application ID |||||||||
| 6 | Ext. bit | CgPN ind. | CdPN ind. | msg. delivery status notification 820 | Acknowledge request ||||
| 7 | Ext. bit | Reserved || Operation mode ||| Priority ||
| 8 | 0 | Called party number information element identifier |||||||
| 9 | Length of calling party number |||||||||
| 10 | 1 | Type of number ||| Numbering plan identification ||||
| 11 | 0 | Number digits (IA5 characters) |||||||
| ⋮ | ⋮ |||||||||
| N | ⋮ |||||||||
| N+1 | Data content length |||||||||
| N+2 | Language code #1 |||||||||
| N+3 | Content length for language code #1 |||||||||
| N+4 | Acknowledge (mandatory) |||||||||
| N+5 | Cause value for failure (optional) |||||||||
| N+6 | Language code #2 |||||||||
| N+7 | Content length for language code #2 (20 octets of data) |||||||||
| N+8 | Data content for language code #2 |||||||||
| ⋮ | ⋮ |||||||||
| ⋮ | ⋮ |||||||||
| N+27 | ⋮ |||||||||

FIG. 9

|   | 8 | 7 | 6 | 5 | 4 | 3 | 2 | 1 |
|---|---|---|---|---|---|---|---|---|
| 1 | User-to-User information element identifier |||||||||
| 2 | User-to-User content length ||||||||
| 3 | Protocol identifier ||||||||
| 4 | PHS system |||| UUS Application ID length ||||
| 5 | UUS Application ID ||||||||
| 6 | Ext. bit | CgPN ind. | CdPN ind. | Reserved* | Acknowledge request ||||
| 7 | Ext. bit | Reserved || Operation mode || Priority |||
| 8 | 0 | Called party number information element identifier |||||||
| 9 | Length of calling party number ||||||||
| 10 | 1 | Type of number ||| Numbering plan identification ||||
| 11 | 0 | Number digits (IA5 characters) |||||||
| ⋮ | ⋮ ||||||||
| N | ⋮ ||||||||
| N+1 | Data content length ||||||||
| N+2 | Language code #1 ||||||||
| N+3 | Content length for language code #1 ||||||||
| N+4 | Data content ||||||||
| ⋮ | ⋮ ||||||||
| ⋮ | ⋮ ||||||||
| N+M | Language code #2 ||||||||
| N+M+1 | Content length for language code #2 ||||||||
| N+M+2 | Data content ||||||||
| ⋮ | ⋮ ||||||||
| ⋮ | ⋮ ||||||||

Note 1: The data field in UUI is set as follows:
- Operation mode: Discontinue communication upon failure
- Acknowledge request: No acknowledge is required Note 2: This call flow illustrates that SMSC notifies the message sender the status of message delivery

METHOD AND APPARATUS FOR SUPPORTING SHORT-MESSAGING IN A COMMUNICATION NETWORK

This application is based on and claims priority to U.S. Provisional Application No. 60/360,317, filed on Feb. 28, 2002, which is hereby incorporated herein by reference.

BACKGROUND OF THE INVENTION

This invention relates to a method and apparatus for short-messaging in a communication network. More particularly, the invention is directed to an improved method for short-messaging which allows for a service that is adaptable to different communication networks and complies with accepted standards in the industry. The system utilizes a unique message format that allows for improved short-messaging service and short-messaging service-based information retrieval.

While the invention is particularly directed to the art of short-messaging and is described with specific reference to the personal handyphone system (PHS), it will be appreciated that the invention may have usefulness in other fields and applications. For example, the invention may have application in other wireless and wireline networks which are compatible with the described message format.

By way of background, the PHS is a wireless system which has been deployed in Japan and other countries such as Thailand, China, Taiwan, . . . etc. The PHS system is built on existing wireline public network by using ISDN signaling (a subset of Q.931 and Q.932 messages).

Because the PHS system is implemented in different environments in different countries, a short-messaging service that is adaptable to such different environments is desired. In this regard, it is desirable that a short-messaging service meet the ITU-T standards and provide seamless operation between country borders.

For example, user-to-user information (UUI) elements may have a format generally defined by ITU-T recommendation Q.931 and RCR STD-28 (both of which are incorporated herein by reference), as illustrated in FIG. 1. As shown, the UUI format is eight (8) bits in width and may have a maximum length of 131 octets or bytes. A user-to-user information (UUI) element identifier 12, a user-to-user content length 14, a protocol identifier 16 and user information 18 are part of the content of the UUI 20. However, no known short-messaging services meet the above stated objectives and complies with the relevant standards, in terms of User-to-User Signaling which carries User-to-User information (UUI) shown in FIG. 1, and in terms of flexibility and SMS-based service completeness.

The present invention contemplates an improved short-messaging service system that resolve the above-referenced objectives and others.

SUMMARY OF THE INVENTION

A method and apparatus for providing short-messaging service in a communication network is provided.

In accord with one aspect of the present invention, the method for doing so comprises determining whether a short message will be sent on a first communication path from a first personal station to a second personal station directly through the communication network or on a second communication path from the first personal station to the second personal station via a short message center within the communication network and, based on the determining, 1) transmitting the short message on the first communication path from the first personal station, acknowledging receipt of the short message by the second personal station and releasing the call by the first personal station based on the acknowledging or 2) transmitting the short message on the second communication path from the first personal station, acknowledging receipt of the short message by the short message center, releasing the call, transmitting the short message on the second communication path from the short message center, acknowledging receipt of the short message by the second personal station, releasing the call, notifying the first personal station by the short message center of the receipt of the short message by the second personal station, and releasing the call by the short message center or the first personal station.

In accord with another aspect of the invention, information services are provided using the UUI carried in user-to-user signaling to make queries to information servers to obtain the information (e.g. stock quotes, weather, . . . etc.) via the short message center or to implement other services (e.g. telemetry, point-to-point or point-to-multipoint broadcast, . . . etc.).

In accord with another aspect of the invention, the UUI format provided by the present invention allows for the UUI element to be handled in the above-described manner.

In accord with another aspect of the invention, a means for implementing is provided.

Further scope of the applicability of the present invention will become apparent from the detailed description provided below. It should be understood, however, that the detailed description and specific examples, while indicating preferred embodiments of the invention, are given by way of illustration only, since various changes and modification within the sphere and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 1 is an illustration of a known UUI format;

FIG. 2 is an illustration of a network architecture into which the present invention may be implemented;

FIG. 4 illustrates a UUI format according to the present invention;

FIG. 5 illustrates a UUI format according to the present invention;

FIG. 6 illustrates a UUI format according to the present invention;

FIG. 7 illustrates a UUI format according to the present invention;

FIG. 8 illustrates a UUI format according to the present invention;

FIG. 9 illustrates a UUI format according to the present invention;

DETAILED DESCRIPTION OF THE PREFERRED EMBODIMENTS

Figure 3:
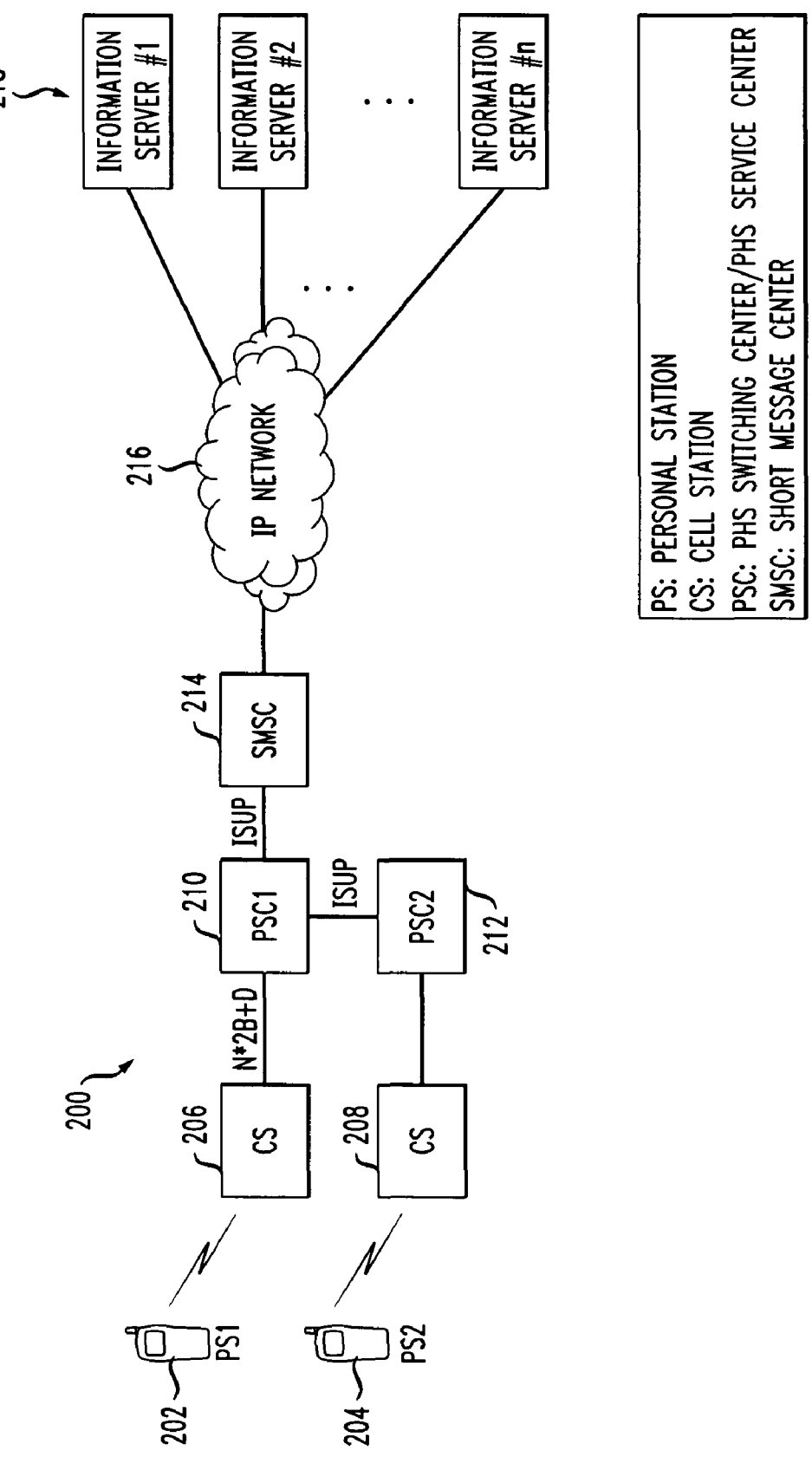
FIG. 3 is an illustration of a network architecture into which the present invention may be implemented.

The method and apparatus of the present invention provides for a PHS short message service (SMS) that allows a PHS user to send a short message to another user directly or indirectly via a PHS short message service center. Moreover, the system, in some embodiments, allows a PHS user to query information servers such as stock, airline flight, weather, news/sports, . . . etc. PHS information services allows the PHS operators to broadcast information to PHS information service subscribers, to provide advertisement services, . . . etc. Again, it should be appreciated that the system could be adapted to other wireless and wireline systems as well.

These embodiments of the invention are advantageous in that they use existing ITU-T UUS (User-to-User Signaling) mechanisms to deliver user information in the form of UUI content to achieve the objectives of the present invention. That is, the interface protocols to support PHS SMS and SMS-based information services as described herein are based in ITU-T User-to-User Signaling (UUS) Service. UUS is described in, for example, ITU-T recommendation Q.737.1 and ITU-T recommendation Q.957.1, both of which are incorporated herein by reference. The WI content, in the preferred format, according to the present invention, provides the flexibility for PHS SMS and information service offering that is not heretofore known yet compatible with accepted standards.

Advantages of the present invention include similar call flows for short-messaging services and information services, the addition of new information services without a handset modification, the provision of short messages in multiple languages, and reduce development costs for both PHS handsets and network infrastructure.

Referring now the drawings, wherein the showings are for purposes for illustrating preferred embodiments of the invention only and not for limiting same, FIG. 2 provides an illustrative view of an overall network architecture into which the present invention may be implemented. As shown, a network 100 includes personal station (PS) 112 and personal station (PS) 114 which respectively connect to cell stations (CS) 116 and 118. The personal stations may take a variety of forms, including that of a cell phone or wireless handset. Also shown are PHS switching centers/PHS service centers (PSC) 120 and 122. In the network 100, the PSC 120 is in communication with a short message center (SMSC) 124 which includes a server 126, a database 128 and an office administrator and maintenance computer 130.

In operation, when the personal station 112 is operable to send a short message to personal station 114, the user composes a short message. Then, a determination is made by the user as to whether this short message will be sent on a first communication path from the personal station 112—through cell station 116, PSC 120, PSC 122, and cell station 118—to the personal station 114. This determination/selection is made by the user through an icon or menu selection or the personal station. If the short message is transmitted on the first path successfully to PS 114, the PS 114 acknowledges receipt of the short message. The personal station 112 then releases the call based on a positive acknowledgement of receipt of the message.

If it is determined by the user (again, through an icon or menu selection on the personal station) that the short message should be sent on a second communication path from the personal station 112 to the cell station 116, the PSC 120 and the message center 124 before being routed to the PS 114, then the sending of an acknowledgement of receipt of the message is handled in three distinct steps. First, PS 112 transmits the short message on the second communication path to the short message center (SMSC) 124. The short message center then sends the message to the PS station 114. Upon receipt of the short message, the PS 114 acknowledges receipt of the short message. Once the short message center (SMSC) 124 receives this acknowledgement, it merely notifies the PS 112 of the receipt without requiring an acknowledgement. The call is then released by the PS 112.

It should be understood that the user, whether selecting to transmit over the first or second communication path, may also set a priority for the short message. This, too, may be input via menu or icon selection. Of course, the user may also choose to input numbers or letters instead of using icons/menus when making any of the user selections contemplated herein.

It is to be appreciated that the above described features are accomplished by the system by implementing an improved UUI format content that complies with the relevant standards but still allows for the flexibility and adaptability necessary to be used in different environments, such as different countries. In this regard, the contents of the UUI format, generally described above, is modified according to the present invention to allow short messaging to be accomplished in both environments described in connection with FIG. 2. The modified format and appurtenant content variations dictate for the system the path of the short message that is being transmitted. In addition, the content of certain portions of the message format dictates the information that is included in the remaining portions of the UUI content.

Of course, UUS signaling is used in connection with the UUI format to allow for an improved system that meets the relevant standards. In addition, it should be recognized that the method and apparatus according to the present invention are implemented in known networks, using standard equipment. However, the invention is accomplished through the use of the improved UUI format, suitable protocols, and appropriate signaling and messaging techniques. These protocols and signaling and messaging techniques are generally known in the art, but may include modifications, to achieve the objectives of the present invention, that will be apparent from the detailed description provided herein.

Referring now to FIG. 4, the UUI content sent directly from a personal station (PS) to a personal station (PS) through a network is illustrated. As shown, the UUI content format 400 is 8 bits wide and 131 octets long (maximum). The first octet 402 contains user-to-user information element identifier. The second octet includes user-to-user content length information. This octet indicates the user-to-user information element length in the range of one to one twenty-nine. Octet 3 contains a protocol identifier which is defined by ITU-T Q.931 and RCT standard-28. The fourth octet includes information on a particular PHS system used in bits 5 through 8 and the UUS application ID length in bits 1 through 4. The UUS application ID 412 is stored in octet 5. Octet 6 includes an extension bit 414, a calling party number indicator 416, a called party number indicator 418, a reserved bit 420, and an acknowledgement request 422. Notably, for transmission of short messages directly from one personal station to another through a network, the called party number indicator and the calling party number indicator are set to -0-. The seventh octet includes an extension bit 424, a reserved bit 426, three bits reserved for operation mode indicator 428, and a priority indicator 430. The eighth octet includes a data content length 432. The ninth octet includes a language code 434 and the tenth octet includes a content length for the language code 436. Data content can then be stored thereafter. If another language code is utilized, such language code 438 can be stored in an N+1 octet along with the content length for the language code in the N+2 octet. Again, data content can then be stored thereafter.

More specifically, the UUI content is, in one form, provided as detailed below. As mentioned above, it is this content that provides the bases for the operation of the system of the invention and the consistency with the relevant standards. Of course, it is to be appreciated that such content is varied to accommodate the different operation modes of the system. For example, as will be described in more detail below, varying the content will dictate whether the short message is transmitted from PS to PS directly through network components or indirectly through the SMSC. Those of skill in the art, once familiar with the present invention, will recognize other configurations that will suffice to accomplish the objectives of the invention.

Octet 1: User-to-user information element identifier
This octet is defined in Q.931 section 4.5.30 and RCT STD-28 4.4.3.7.3.5.26.
Value: 7E hexa
Bits
8 7 6 5 4 3 2 1
0 1 1 1 1 1 1 0         User-to-user information element
Octet 2: User-to-user content length
This octet indicates the user-to-user information element length (excluding octets 1 and 2)
Range 1-129 (Decimal)
Octet 3: Protocol identifier
It is defined by ITU-T Q.931 and RCR STD-28.
Value: 43 (hexa)
Bits
8 7 6 5 4 3 2 1
0 1 0 0 0 0 1 1       National use common format for specific application identification
Octet 4: Bits 8-5: PHS system
Bits
8 7 6 5
0 0 0 0     Reserved
0 0 0 1     Lucent PHS System
0 0 1 0     Reserved
0 0 1 1     Reserved
  Others   Reserved
Bits 4-1: UUS Application ID length
Value: 1 (decimal)
Octet 5: UUS Application ID
Bits
8 7 6 5 4 3 2 1
0 0 0 0 0 0 0 1     PHS basic SMS
  Others   Reserved
Octet 6: First control byte
Bit 8: value = binary 0 (not the last octet)
Bit 7: value = binary 0 (calling party number not included)
Bit 6: value = binary 0 (called party number not included)
Bits 1-4: value = decimal 3 (acknowledge on both success and failure)
Bits
8     Extension bit
0     Not the last byte (for control bytes)
1     The last byte (for control bytes)
7     Calling party number indicator
0     Calling party number not included
1     Calling party number included
6     Called party number indicator
0     Called party number not included
1     Called party number included
5     Reserved
4 3 2 1     Acknowledge Request
0 0 0 0     Reserved
0 0 0 1     Acknowledge on success (not used for basic SMS)
0 0 1 0     Acknowledge on failure (not used for basic SMS)
0 0 1 1     Acknowledge on both success and failure
0 1 0 0     Acknowledge is not required (used for message delivery notification
  Others   Reserved
Octet 7: Second control byte
Bit 8: value = binary 1 (the last octet)
Bits 3-5: value = binary 000 (Operation mode is "discontinue communication upon failure")
Bits 1-2: Priority is set to default ("Normal") for PS to PS communication
Bits
8     Extension bit
0     Not the last byte (for control bytes)
1     The last byte (for control bytes)
Bits
7 6     Reserved
5 4 3     Operation mode
0 0 0     Discontinue communication upon failure (Used for PHS basic SMS)
0 0 1     Continue communication upon failure (Not used for PHS basic SMS)
  Others   Reserved
2 1     Message Priority
0 0     Low
0 1     Normal (Default)

-continued

| 1 | 0 | | High |
|---|---|---|---|
| 1 | 1 | | Highest |

Octet 8: Data content length
This octet indicates the short message content length.
Range 1-123 (decimal)
Octet 9: Language code
Bits 1-8 value is set to IA5, GB2312 or "mixed IA5 and GB2312"
Bits

| 8 | 7 | 6 | 5 | 4 | 3 | 2 | 1 | |
|---|---|---|---|---|---|---|---|---|
| 1 | 0 | 0 | 0 | 0 | 0 | 0 | 0 | Control code (see note 1 below) |
| 0 | 0 | 0 | 0 | 0 | 0 | 0 | 1 | IA5 |
| 0 | 0 | 0 | 0 | 0 | 0 | 1 | 0 | GB2312 |
| 0 | 0 | 0 | 0 | 0 | 0 | 1 | 1 | GB13000 |
| 0 | 0 | 0 | 0 | 0 | 1 | 0 | 0 | GB18030 |
| 0 | 0 | 0 | 0 | 0 | 1 | 0 | 1 | Mixed IA5 and GB2312 |
| | | | Others | | | | | Reserved |

Octet 10: Content length for a given language code
This octet indicates content length for the specific language code
Range: 1-121 (decimal)
Octets 11-N: Data content for a given language code
Control code and the data content are used as below:
Case 1: Language code is 80h. The data content presents the acknowledgement of the message reception.
Bits

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Reserved |
| 0 | 0 | 0 | 0 | 0 | 0 | 0 | 1 | Success for acknowledge |
| 0 | 0 | 0 | 0 | 0 | 0 | 1 | 0 | Failure for acknowledge |
| 0 | 0 | 0 | 0 | 0 | 0 | 1 | 1 | Success for message delivery via SMSC |
| 0 | 0 | 0 | 0 | 0 | 1 | 0 | 0 | Failure for message delivery via SMSC |
| 0 | 0 | 0 | 0 | 0 | 1 | 0 | 1 | Message delivery delayed |
| | | | Others | | | | | Reserved |

Note 1: When the short message header (from "control byte" to "content length for language code") is incorrect, acknowledge for failure is used.
Note 2: Cause value may be added to the next octet (after acknowledge) as an optional data field. The cause values are defined in RCR STD-28 section 4.4.3.7.5.10.
Case 2: Language code is 00h, 01h-FFh (not include "80h"). The data content means the message content.

Referring now to FIG. 5, the content format of a UUI sent from a personal station PS (e.g. PS 112) to a short message service center (e.g. 124), such as that shown in FIG. 2. In this regard, a UUI 500 is 8 bits wide and 131 octets in length (e.g. maximum). The user-to-user information element identifier 502, user-to-user content length 504, protocol identifier 506, PHS system information 508, UUS application ID length 510, and UUS application ID 512 take the form as described in connection with FIG. 4 in the first 5 octets of the UUI format. Likewise, octets 6 and 7 take a similar form to octet 6 and 7 of FIG. 4; however, the values in these octets vary—because the short message is being transmitted from the personal station to the short messaging center as opposed to another personal station directly. In this regard, this message format, for octets 6 and 7, provides for an extension bit 514, a calling party number indicator 516, a called party indicator 518, a reserved bit 520 (see detail below), an acknowledgement request 522, a further extension bit 524, a reserved bit 526, operation mode information 528, and priority information 530. The difference between the UUI content format shown in FIG. 4 and that shown in FIG. 5, as shown in more detail below, is that the called party number indicator bit 518 in octet 6 takes a value of one (1) in these circumstances. In this way, the same UUI format can be used whether short messages are delivered from the personal station to a personal station directly or from a personal station to the SMSC.

As further shown, octet 8 includes a called party number information identifier 532, octet 9 includes a length of called party number 534, octet 10 includes a type of number and a numbering plan identification 536, and octet 11 through octet N identifies the actual called party number 538. As shown, the data content in various languages can be then stored in the remainder of the UUI content.

More specifically, the UUI content is, in one form, provided as detailed below. Those of skill in the art, once familiar with the present invention, will recognize other configurations that will suffice to accomplish the objectives of the invention.

Notes:
For the meaning of octets 1 to 7 and N+1 to 131, refer to FIG. 4.
For the meaning of octets 8 to N, refer to ITU-T Q.931 section 4.5.8 and RCR STD-28 section 4.4.3.7.3.5.6.
Octet 6: First control byte
Bit 8: value = binary 0 (not the last octet)
Bit 7: value = binary 0 (calling party number not included)
Bit 6: value = binary 1 (called party number included)
*Bit 5: Reserved bit or "Message delivery status notification" indicator bit
→ Case 1: PHS SMS application
Bit 5 "Message delivery status notification" indicator controls the option whether a PS user wants to receive the notification of message delivery status.
value=binary 0 (turn off "message delivery status notification" option)
value=binary 1 (turn on "message delivery status notification" option)
→ Case 2: PHS SMS-based information service application
Bit 5 is a reserved bit, encoded as binary 0.
Bits 1-4: value=decimal 3 (acknowledge on both success and failure)
Octet 7: Second control byte
Bit 8: value = binary 1 (the last octet)
Bits 3-5: value = binary 000 (Operation mode is "discontinue communication upon failure")
Bits 1-2: Priority is set to "Low"/"Normal"/"High"/"Highest" for PS to SMSC communication.
Octet 8: Called party number information element identifier
Bits

| 8 | 7 | 6 | 5 | 4 | 3 | 2 | 1 | |
|---|---|---|---|---|---|---|---|---|
| 0 | 1 | 1 | 1 | 0 | 0 | 0 | 0 | Called party number information element identifier |

Octet 9: The length of called party number
Octet 10: Type of number/numbering plan
The type of number/numbering plan shall comply with the numbering requirements of China wireline (e.g. ISDN) and wireless (e.g., GSM, CDMA, and . . . ) specification.
The valid combinations of "type of number" and "numbering plan" for PS are: (refer to Lucent PHS handset requirements)
Unknown/unknown
National number/ISDN
Bits

| 7 | 6 | 5 | Type of Number |
|---|---|---|---|
| 0 | 0 | 0 | Unknown |
| 0 | 0 | 1 | International number |
| 0 | 1 | 0 | National number |
| 0 | 1 | 1 | Network specific number |
| 1 | 0 | 0 | Subscriber number (reserved for RCR STD-28) |
| 1 | 1 | 0 | Abbreviated number (reserved for RCR STD-28) |
| 1 | 1 | 1 | Reserved for extension |
| | Others | | Reserved |

Bits

| 4 | 3 | 2 | 1 | Numbering plan identification |
|---|---|---|---|---|
| 0 | 0 | 0 | 0 | Unknown |
| 0 | 0 | 0 | 1 | ISDN/telephony numbering plan (Recommendation E. 164) |
| 0 | 0 | 1 | 1 | Data numbering plan (Recommendation X. 121) |
| 0 | 1 | 0 | 0 | Telex numbering plan (Recommendation F. 69) |
| 1 | 0 | 0 | 0 | National standard numbering plan |
| 1 | 0 | 0 | 1 | Private numbering plan |
| 1 | 1 | 1 | 1 | Reserved for extension |
| | Others | | | Reserved |

Octet 11 to N: Number of digits (IA5 characters) presents the called party number.

Along these same lines, referring now to FIG. 6, the UUI content format for a UUI 600 is illustrated. The UUI 600 is the UUI content format taken on when a message is sent from the short message center (SMSC) to a personal station (PS). In this regard, the format mimics the format of the UUI content in FIGS. 4 and 5 for octets 1-5. In addition, octets 6 and 7 take a similar form. However, as will be described in more detail below, the information in octet 6 and 7 differs from that in FIGS. 4 and 5. Most notably, bit 7 (reference number 618) of octet 6 includes a binary 1 value indicating that the calling party number is included in the message. That being the case, the eighth octet of the UUI includes the calling party number information element identifier, the ninth octet includes the length of calling party number, the tenth octet includes the type of number and the numbering plan identification, and the twelfth octet to Nth octet include the actual calling party number. Octet eleven also includes other information. In this way, when the message is being sent from the short message center, such as SMSC 124, to a personal station such as personal station 114 of FIG. 2, personal station 114 is provided with the number of personal station 112, e.g. the calling party. This enables the message to be routed through the short message center yet still maintain a format that is useful for both PS-to-PS direct short-messaging and PS-to-PS indirect short-messaging through the short message center (SMSC).

More specifically, the UUI content is, in one form, provided as detailed below. Those of skill in the art, once familiar with the present invention, will recognize other configurations that will suffice to accomplish the objectives of the invention.

Notes:
For the meaning of octets 1 to 7 and N+1 to 131, refer to FIG. 4.
For the meaning of octets 8 to N, refer to ITU-T Q.931 section 4.5.10 and RCR STD-28 section 4.4.3.7.3.5.8.
The type of number and numbering plan identification are coded in the same way as the called party number information element.
Octet 6: First control byte
Bit 8: value = binary 0 (not the last octet)
Bit 7: value = binary 1 (calling party number included)
Bit 6: value = binary 0 (called party number not included)
Bits 1-4: value = decimal 3 (acknowledge on both success and failure)
Octet 7: Second control byte
Bit 8: value = binary 1 (the last octet)
Bits 3-5: value = binary 000 (Operation mode is "discontinue communication upon failure")
Bits 1-2: Priority is set to "Low"/"Normal"/"High"/"Highest" for SMSC to PS communication, which is the same as for PS to SMSC communication.
Octet 8: Calling party number information element identifier
Bits

| 8 | 7 | 6 | 5 | 4 | 3 | 2 | 1 | |
|---|---|---|---|---|---|---|---|---|
| 0 | 1 | 1 | 0 | 1 | 1 | 0 | 0 | Calling party number information element |

Octet 9: The length of calling party number
Octet 10: Type of number/numbering plan
The type of number and numbering plan identification are coded in the same way as the called party number information element.
The type of number/numbering plan shall comply with the numbering requirements of China wireline (e.g., ISDN) and wireless (e.g., GSM, CDMA, . . . ) specification.
The valid combinations of "type of number" and "numbering plan" for PS are: (refer to Lucent PHS handset requirements)
Unknown/unknown
National number/ISDN
Octet 11: Presentation indicator and network screening indicator
Bits

| 7 | 6 | |
|---|---|---|
| | | Presentation indicator |
| 0 | 0 | Presentation allowed |
| 0 | 1 | Presentation restricted |
| 1 | 0 | Number not available due to interworking |
| 1 | 1 | Reserved |

Note - The meaning and the use of this field is defined in clauses 3/Q.951 and 4/Q.951.
Bits

| 2 | 1 | |
|---|---|---|
| | | Network screening indicator |
| 0 | 0 | User-provided, not screened |
| 0 | 1 | User-provided, verified and passed |

-continued

| 1 | 0 | User-provided, verified and failed |
|---|---|---|
| 1 | 1 | Network provided |

Note - The meaning and the use of this field is defined in clauses 3/Q.951 and 4/Q.951.

Octet 12 and N: Number digits (IA5 characters) presents the calling party number.

Referring to FIG. 7, the UUI content format for an acknowledgement is illustrated. As shown, a UUI 700 is 8 bits wide and 11 or 12 octets long. It includes the user-to-user information element identifier 502, a user-to-user content and length 504, a protocol identifier 506, a PHS system indicator 508, a UUS application ID length 510, and a UUS application ID 512. Again, these first five octets are similar in all the UUI content formats discussed.

More specifically, the UUI content of the remaining octets is, in one form, provided as detailed below. Those of skill in the art, once familiar with the present invention, will recognize other configurations that will suffice to accomplish the objectives of the invention.

Notes:
For the meaning of octets 1 to 12, refer to FIG. 4.
Octet 6: First control byte (the content same as one in the received mail content)
Bit 8: value = binary 0 (not the last octet)
Bit 7: value = binary 0 (calling party number not included)
Bit 6: value = binary 0 (called party number not included)
Bits 1-4: value = decimal 3 (acknowledge on both success and failure)
Octet 7: Second control byte (the content same as one in the received mail content)
Bit 8: value = binary 1 (the last octet)
Bit 3-5: value = binary 000 (Operation mode is "discontinue communication upon failure")
Bits 1-2: Priority is set to the same value received in UUI (message content)
Octet 8: Data content length (Acknowledge)
Value = decimal 3 or 4
Octet 9: Language code
Value = hexa 80 (control code)
Octet 10: Content length for language code
Value = decimal 1 or 2
Octet 11 Acknowledge (mandatory)
Value = hexa 01 (Success for acknowledge - OK)
Value = hexa 02 (Failure for acknowledge - NG)
Octet 12: Cause value (optional)
Cause values are defined in ITU-T Q.850 and RCR STD-28 section 4.4.3.7.3.5.5.

Refer to the sections of PHS SMS call flows for the usage of cause values.

Referring now to FIG. 8, a UUI 800 is illustrated. UUI 800 is used to notify the calling personal station of message delivery. In this regard, the first 5 octets are of a form similar to those of the other formats described herein. The remaining portions of the UUI content, however, vary because this message does not require an acknowledgement by the receiving party. Notably, bit 5 (reference number 820) of the sixth octet information on a message delivery status notification. This type of a UUI format is used, for example, when the short message center notifies the calling party that the message was received by the called party. No acknowledgement on the part of the personal station is required, however. The short message sender is able to send individual short messages to different recipients by using this flexible UUI content format.

More specifically, the UUI content is, in one form, provided as detailed below. Those of skill in the art, once familiar with the present invention, will recognize other configurations that will suffice to accomplish the objectives of the invention.

Notes:
For the meaning of octets 1 to N+5, refer to FIGS. 4 and 5.
Octet 6: First control byte (the content same as one in the received mail content)
Bit 8: value = binary 0 (not the last octet)
Bit 7: value = binary 0 (calling party number not included)
Bit 6: value = binary 1 (called party number included)
Bit 5: "Message delivery status notification" indicator controls the option whether a PS user wants to receive the notification of message delivery status.
value = binary 0 (turn off "message delivery status notification" option)
value = binary 1 (turn on "message delivery status notification" option)
Bits 1-4 value = decimal 4 (No acknowledge is required.)
Octet 7: Second control byte
Bit 8: value = binary 1 (the last octet)
Bits 3-5 value = binary 000 (Operation mode is "discontinue communication upon failure")
Bits 1-2: Priority is set to "Normal"
Octet 8-N: Called party number IE is encoded according to ITU-T Q.931 section 4.5.8/RCR STD-28 section 4.4.3.7.3.5.6.
Octet N+1: Data content length (Acknowledge)
Value = decimal 3 or 4
Octet N+2: Language code #1
Value = hexa 80 (control code)
Octet N+3: Content length for language code #1
Value = decimal 1 or 2
Octet N+4: Acknowledge (mandatory)
Value = hexa 03 (Message delivery to called PS is successful.)
= hexa 04 (Message delivery to called PS fails.)
= hexa 05 (Message delivery to called PS is delayed.)
Octet N+5: Cause value
The "cause value" data field shall be populated when the "acknowledge" data field is set to "hexa 04" or "hexa 05".
Cause value = hexa 00 (no cause value)
= other cause values defined in ITU-T Q.850 and RCR STD-28 section 4.4.3.7.3.5.10. Refer to the sections of PHS SMS call flows for the usage of cause values.
Octet N+6: Language code #2
Value = valid language code
Octet N+7 = Content length for language code #2
Value = decimal 20
Octet N+8-Octet N+27: Data content for language code #2
Value = the first 20 octets of the message which is sent from a calling PS to a called party
Note: "Message delivery status notification"indicator
For PS-to-PS via SMSC application
step 1: calling PS-to-SMSC
A calling PS always receives acknowledge from SMSC (because of ack on both success and failure).
step 2: SMSC-to-called PS
SMSC always receives acknowledge from a called PS (because of ack on both success and failure).
step 3: SMSC-to-calling PS
If "message delivery status notification" bit is turned on, then SMSC will send message delivery notification (sec. 3.3.5 or sec. 3.3.6) to a calling PS.
If "message delivery status notification" bit is turned off, then SMSC will not send message delivery notification (sec. 3.3.5 or sec. 3.3.6) to a calling PS.
The "message delivery status notification" option is controlled by a calling PS (default value: off), which is only applicable for PHS SMS application (not for PHS information service.)

When there is a delay in the system, a notification is provided. In this regard, FIG. 9 illustrates a UUI 900 which addresses this situation. UUI 900 is also used for the information services, which is sent from SMCS to a PS as the response to the information query or as broadcast information. Again, the first 5 octets are similar in format to the previously described message formats. However, the contents, not the format, of octets 6 and 7 dictate the information required in the remainder of the UUI content. Here, it is the users option as to whether the user wishes to be notified of such a delay.

More specifically, the UUI content is, in one form, provided as detailed below. Those of skill in the art, once familiar with the present invention, will recognize other configurations that will suffice to accomplish the objectives of the invention.

Notes:
For the meaning of octets 1 to N+5, refer to FIGS. 4 and 5.
Octet 6: First control byte (the content same as one in the received mail content)
Bit 8: value = binary 0 (not the last octet)
Bit 7: value = binary 0 (calling party number not included)
Bit 6: value = binary 1 (called party number included)
*Bit 5: Reserved bit or "Message delivery status notification" indicator bit
→ Case 1: PHS SMS application
Bit 5 "Message delivery status notification" indicator controls the option whether a PS user wants to receive the notification of message delivery status.
value= binary 0 (turn off "message delivery status notification" option)
value= binary 1 (turn on "message delivery status notification" option)
→ Case 2: PHS SMS-based information service application
Bit 5 is a reserved bit, encoded as binary 0.
Bits 1-4: value = decimal 4 (No acknowledge is required.)
Octet 7: Second control byte
Bit 8: value = binary 1 (the last octet)
Bits 3-5: value = binary 000 (Operation mode is "discontinue communication upon failure")
Bits 1-2: Priority is set to any priority value.
Octets 8-N: Called party number IE is encoded according to ITU-T Q.931 section 4.5.8/RCR STD-28 section 4.4.3.7.3.5.6.
Octet N+1: Data content length
Octet N+2: Language code #1
Octet N+3: Content length for language code #1
Octet N+4 to Octet N+M-1: data content for language code #1
Octet N+M: Language code #2
Octet N+M+1: Content length for language code #2
Octet N+M+2 and beyond: data content for language code #2

To gain a further appreciation of the advantages of the present invention, an analysis of the various call-flow diagrams is useful. FIGS. 10-30 and 33-36 will generally be described using the terminology of an originating party 1000, a network 1002 and a terminating party 1004. It is to be appreciated that the originating party may be a personal station such as PS 112, and a terminating party may be a personal station such as PS 114. However, these same call-flows apply if the originating party is a personal station such as PS 112 and the terminating party is the short message service center 124. Likewise, the call-flows apply if the originating party is the short message service center and the terminating party is a personal station such as PS 114. The ability to adapt to these situations is provided for in the present invention by use of the unique UUI content format described in connection with FIGS. 4 through 9. This UUI content format complies with accepted standards, and provides flexibility in application.

For ease of explanation, it is noted that, with respect to the call flows of FIGS. 10-30, these call flows apply when the operation mode (octet 7, bits 3-5) is set to "discontinue communication upon failure." In addition, the acknowledge request (octet 6, bits 1-4) is set to "acknowledge on both success and failure."

Figure 10:
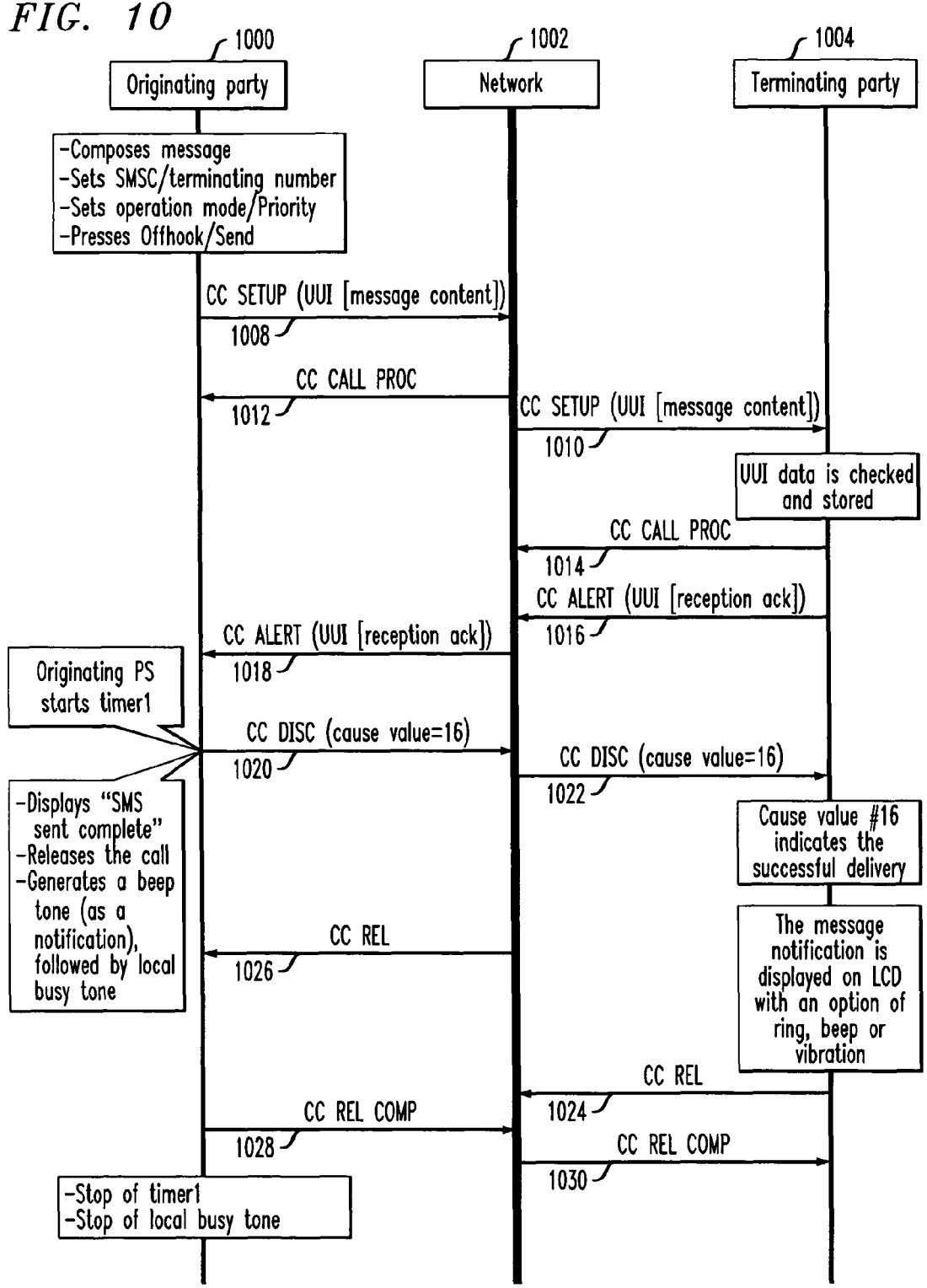
FIG. 10 illustrates a call-flow according to the present invention.

Referring now to FIG. 10, a personal station (PS) to personal station (PS) message delivery call-flow is described. This particular call flow reflects the circumstances when the message delivery is successful. In this regard, an originating party 1000, such as PS 112, composes a short message, indicates (through a menu selection on a phone, for example) whether the short message will be sent directly to a terminating party, such as PS 114, via the network 1002 or indirectly through an SMSC (in which case the terminating party would be the SMSC). In addition, the originating party sets a priority, and initiates the transmission of the message by pressing send. When this occurs, a call control (CC) set-up request 1008 is sent to the network 1002. It is to be appreciated that the call set-up request includes the short message in UUI format. The network then forwards the call set-up request to a terminating party 1004, as shown at 1010. The network 1002 sends the call control call processing (CC CALL PROC) to the originating party after receiving SET-UP message from the originating party, as shown at 1012. The terminating party 1004 then checks the data in the message content and stores it. Of course, the call control processing is started, as shown at 1014. The terminating party sends an ALERT message including a reception acknowledge (in UUI format) 1016 back to the network, which then conveys this message to the originating party 1000, as shown at 1018. Upon receipt, the originating party discontinues the connection, at 1020, and forwards the disconnect request on to the network. The network then forwards the disconnect message to the terminating party, as shown at 1022. It is to be appreciated that the disconnect messages shown at 1020 and 1022 also provide a cause value number, or code, 16—which indicates a successful delivery (normal call clearing) and that the originating party should be charged for the call. The call is then released, as shown at 1024, 1026, 1028 and 1030.

It should be recognized that the description of a PS to PS successful message delivery in connection with FIG. 10 applies to situations where a customer is billed for use of the system and for situations where a user has pre-paid service. Similar call-flows would result.

Figure 11:
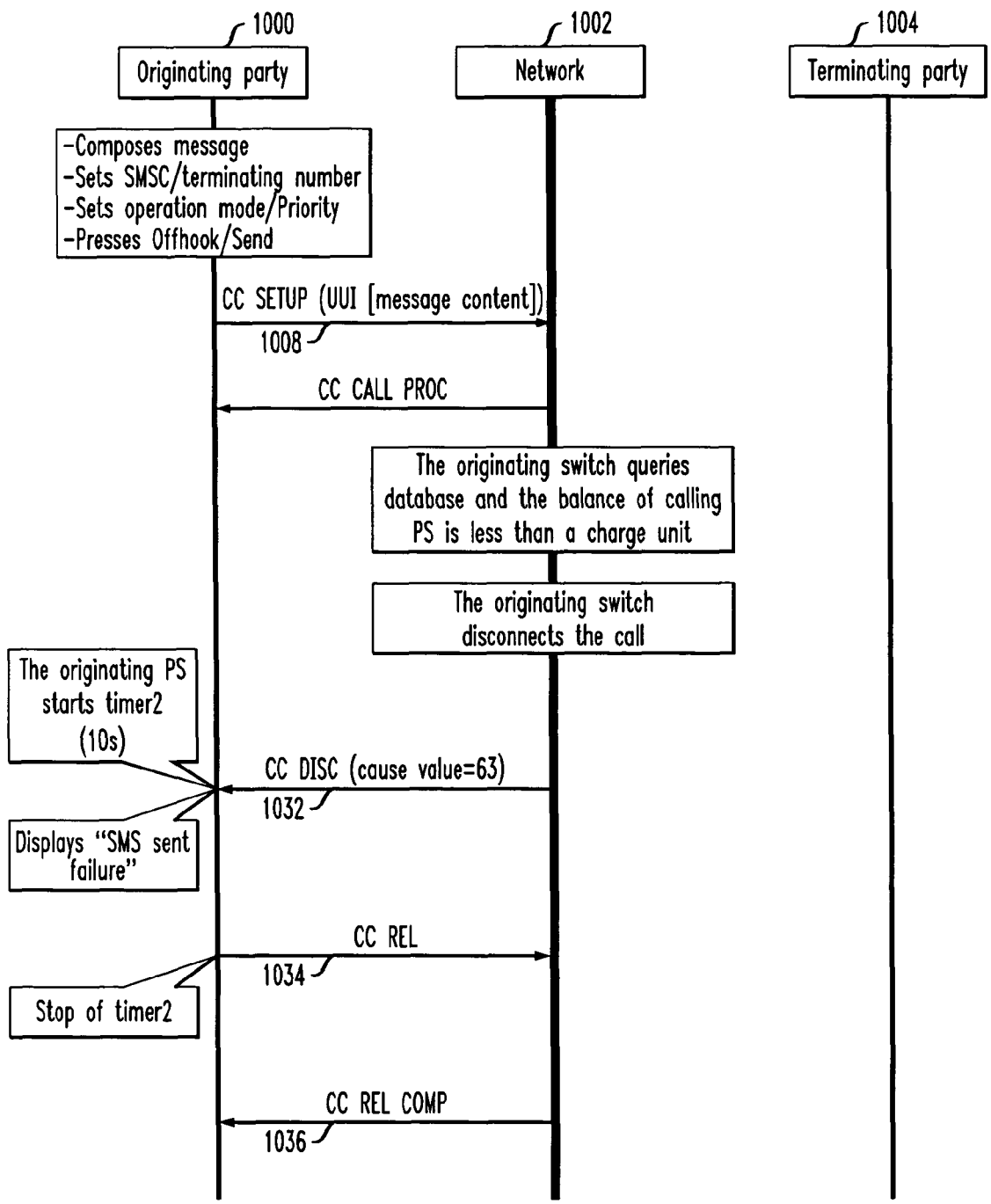
FIG. 11 illustrates a call-flow according to the present invention.

However, where a message delivery fails in a pre-paid situation because a balance is less than a particular charge unit, the call-flow of FIG. 11 addresses the situation. As shown, the originating party sends a UUI formatted message, as shown at 1008, but the originating switch queries the relevant database and determines that the balance of the calling PS is less than a charge unit. As such, the originating switch disconnects the call, as shown at 1032 and provides a cause value of "63" (meaning that "service or option not available, unspecified"). The originating party's phone displays a message "SMS sent failure". The originating party and originating switch then release the call, as shown at 1034 and 1036.

Figure 12:
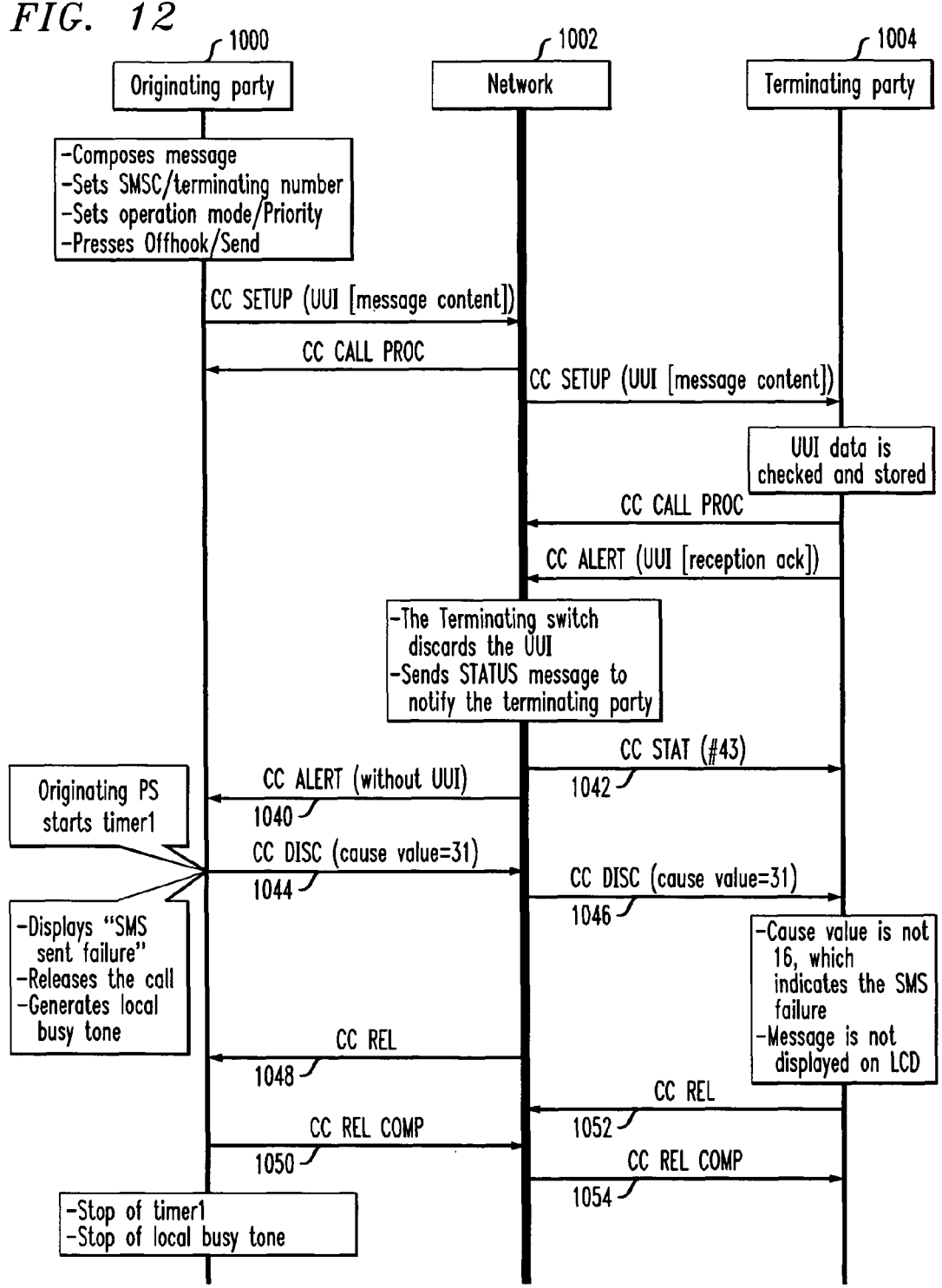
FIG. 12 illustrates a call-flow according to the present invention.

Without regard to whether services are pre-paid or billed services, as shown in FIG. 12 (or FIG. 10), when the terminating party successfully receives a short message in UUI format, an ALERT message (including reception acknowledge in UUI format) is sent back to the network, the reception acknowledge ultimately to the originating party, as shown at 1016 and 1018 (FIG. 10). However, if this reception acknowledge is discarded by the terminating switch (as shown in FIG. 12), then notice is sent to the terminating party, at 1042 along with a cause value of 43 (access information discarded). The originating party receives an ALERT message without the reception acknowledge (i.e. no UUI for reception acknowledge is included), then displays a "SMS sent failure" message, releases the call, and generates a local busy tone. In doing so, the call is disconnected by the originating party as shown at 1044 and 1046. It is to be appreciated that cause value is set to 31 (normal call clearing, unspecified) to indicate that the call failed. Of course, this means that the originating party is not charged for the call. As shown at 1048, 1050, 1052, and 1054, the call is then released.

Figure 13:
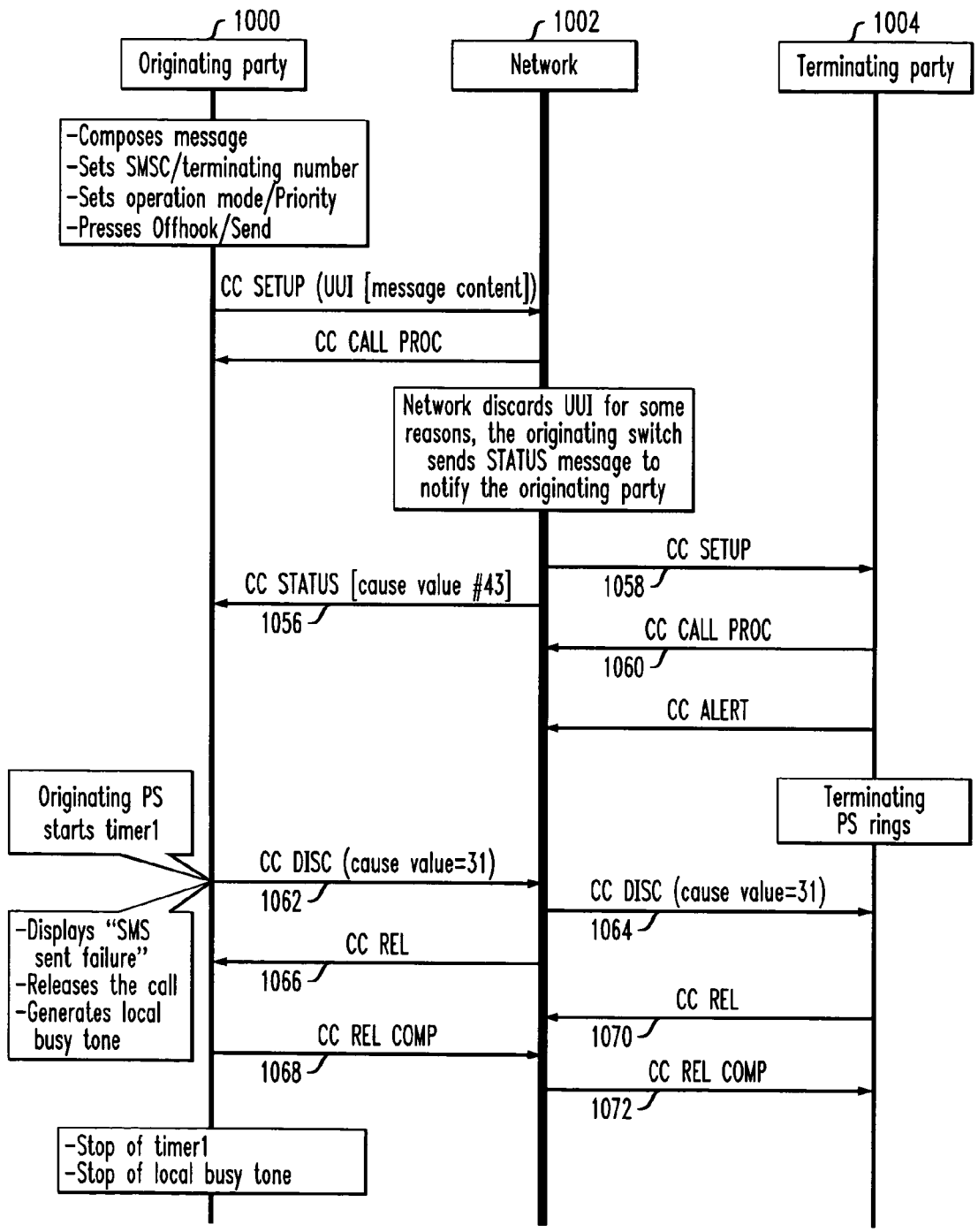
FIG. 13 illustrates a call-flow according to the present invention.

Referring now to FIG. 13, the situation where the UUI content (sent by the originating party) is discarded by the network is addressed. As shown, the originating party 1000 transmits a message in UUI format to the network. If the network discards the UUI, the originating switch sends a STATUS message to notify the originating party as shown at 1056. In the meantime, the originating switch continues to set-up a call with a terminating party as shown at 1058 and 1060. However, once the originating party receives the indication from the originating switch that the UUI content was discarded, the originating party seeks to disconnect and release the call as shown at 1062, 1064, 1066, 1068, 1070, and 1072. It is preferred that the call actually be disconnected before the terminating party rings the phone. If not, the terminating party will pick-up the phone, but the short message will not be on the phone and no call will be connected. It should also be noted that during this process, after receiving a cause value of 43 (access information discarded) from the network, the originating party sends a disconnect with a cause value of 31 (normal unspecified) to indicate that there was a failure in the process.

Figure 14:
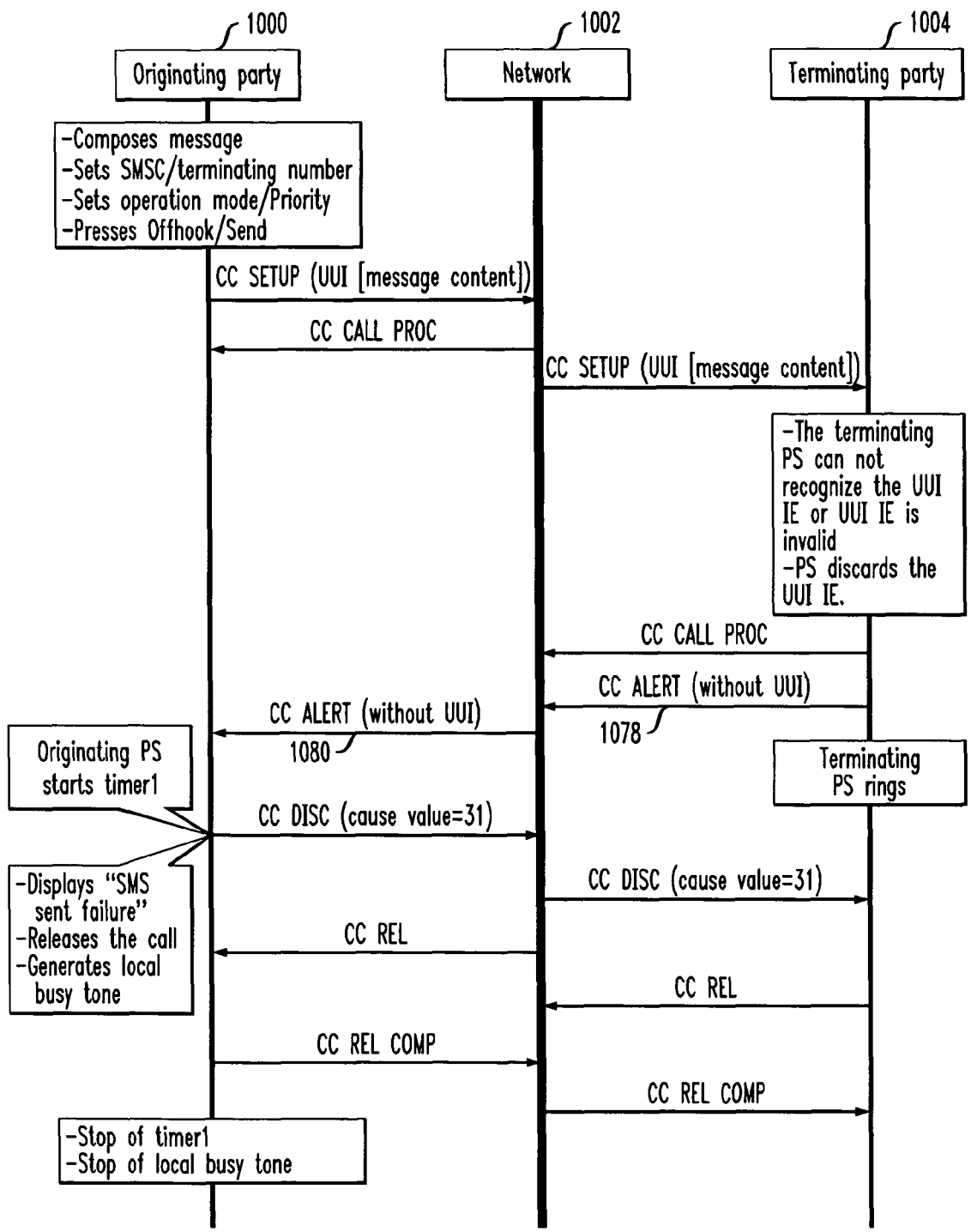
FIG. 14 illustrates a call-flow according to the present invention.

Referring now to FIG. 14, the situation where the terminating party cannot recognize the UUI information element (IE) is addressed. In this regard, after an originating party sends a short message in UUI format, it is received by the terminating party, as previously described. However, if the terminating party is unable to recognize the UUI information element, an ALERT message (without including UUI reception acknowledge), as shown at 1078 and 1080, is sent to the originating party. As previously described, the originating party then disconnects (providing a cause value of 31 (normal call clearing, unspecified)) and releases the call in similar fashion as that described in connection with FIG. 13.

Figure 15:
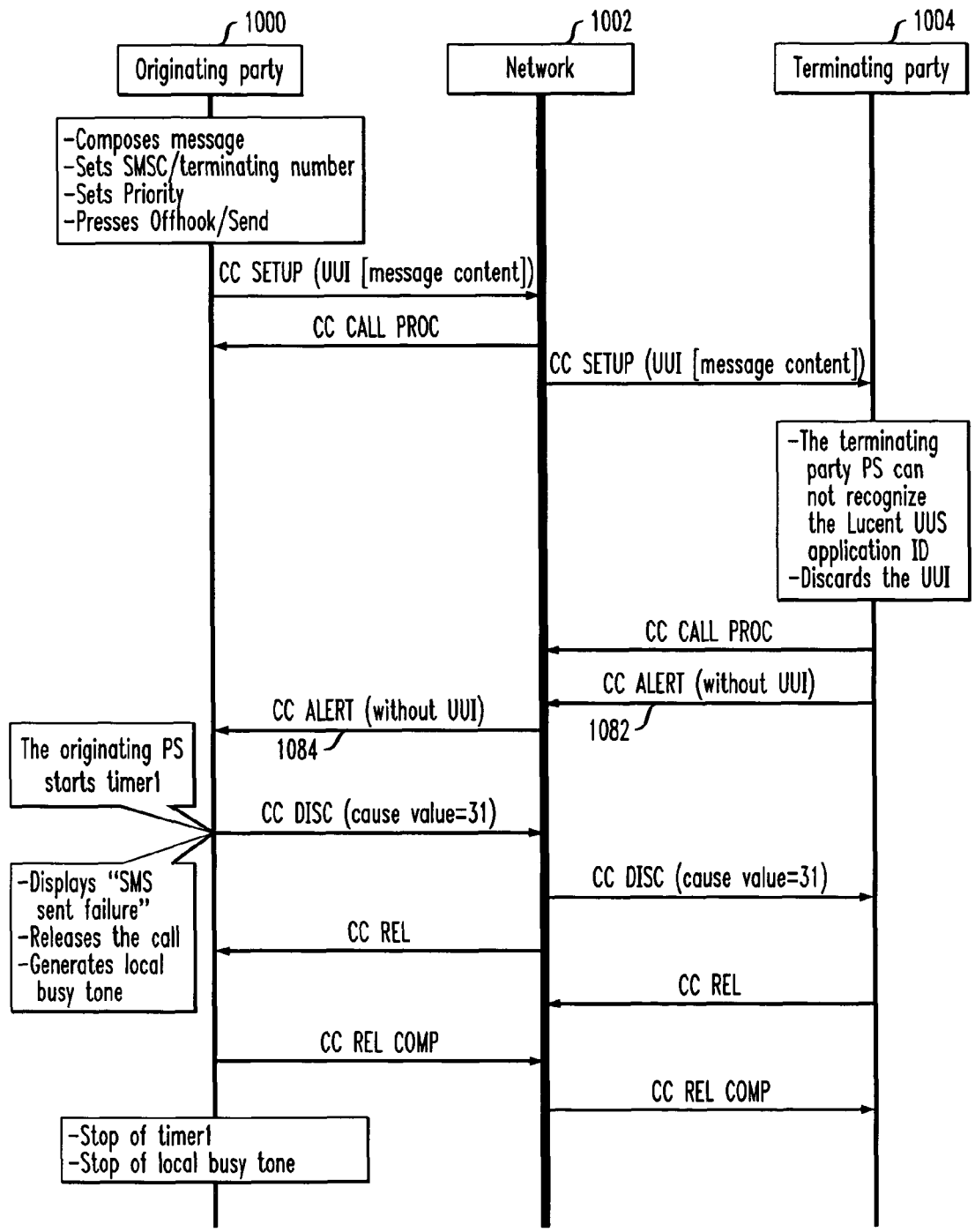
FIG. 15 illustrates a call-flow according to the present invention.

Referring now to FIG. 15, a similar situation is addressed. However, here, the terminating party rejects the UUI content because it does not support the particular UUS application, therefore, cannot recognize the particular UUS application ID (for example, Lucent UUS Application ID) and discards the UUI content. As can be seen, a similar process is that shown in connection with FIG. 14 is followed, including the ALERT messages (without UUI acknowledge) illustrated at 1082 and 1084.

Figure 16:
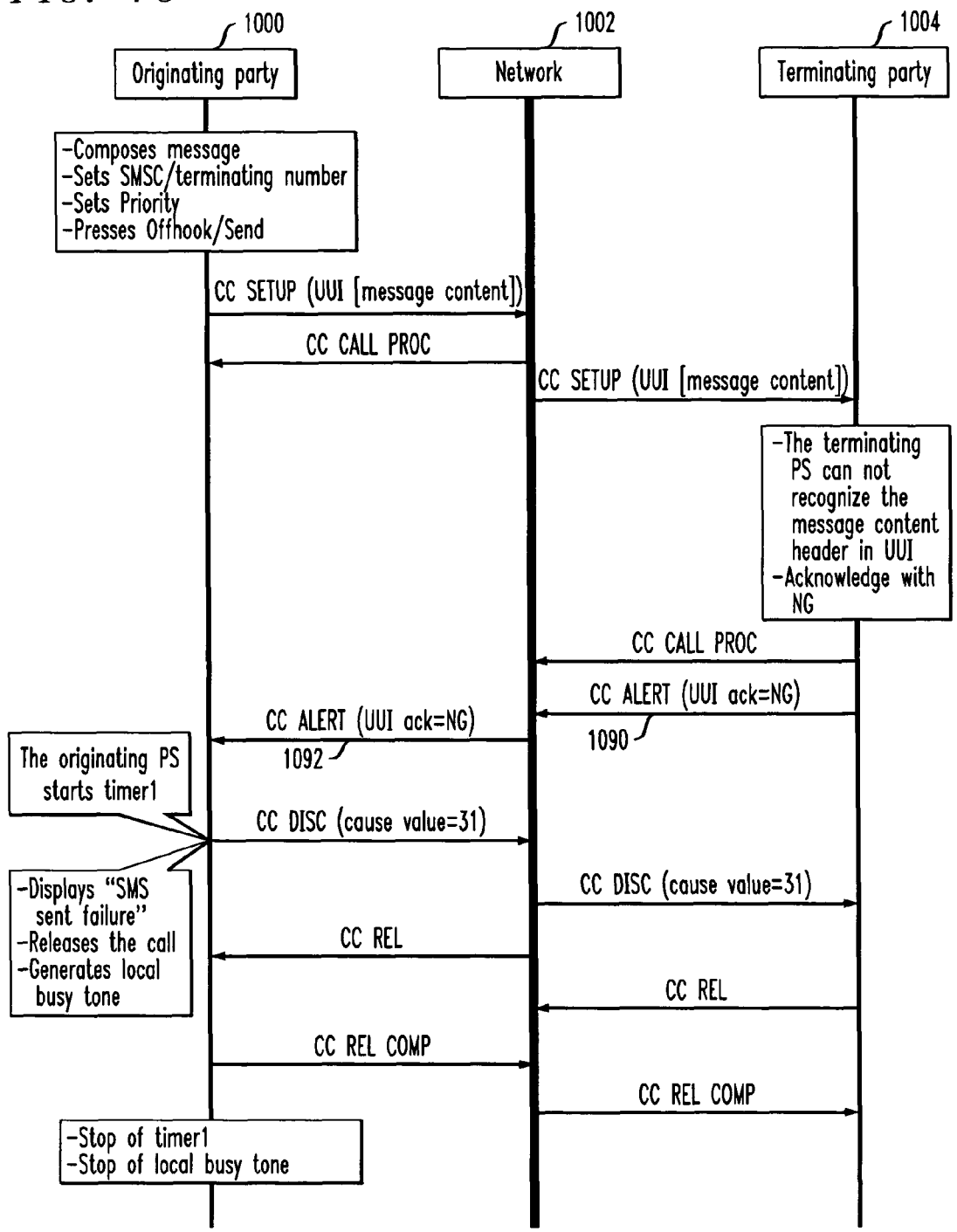
FIG. 16 illustrates a call-flow according to the present invention.

Again, further situations exist where the terminating party will not recognize the UUI message content header. For example, an incorrect message header (from "control bytes" to "content length for language code") may be the cause. An incorrect header could be embodied in an incorrect operation code, ack request, language code, . . . etc. If the terminating party cannot recognize the message content header in the UUI format selected, as shown in FIG. 16, the terminating party sends an ALERT message including the UUI acknowledge being NG, or no good, as shown at 1090 and 1092. Of course, the originating party then displays a failure message, releases the call, and generates a local busy tone. This is accomplished in the same manner as described in connection with FIG. 13, FIG. 14, and FIG. 15.

Figure 17:
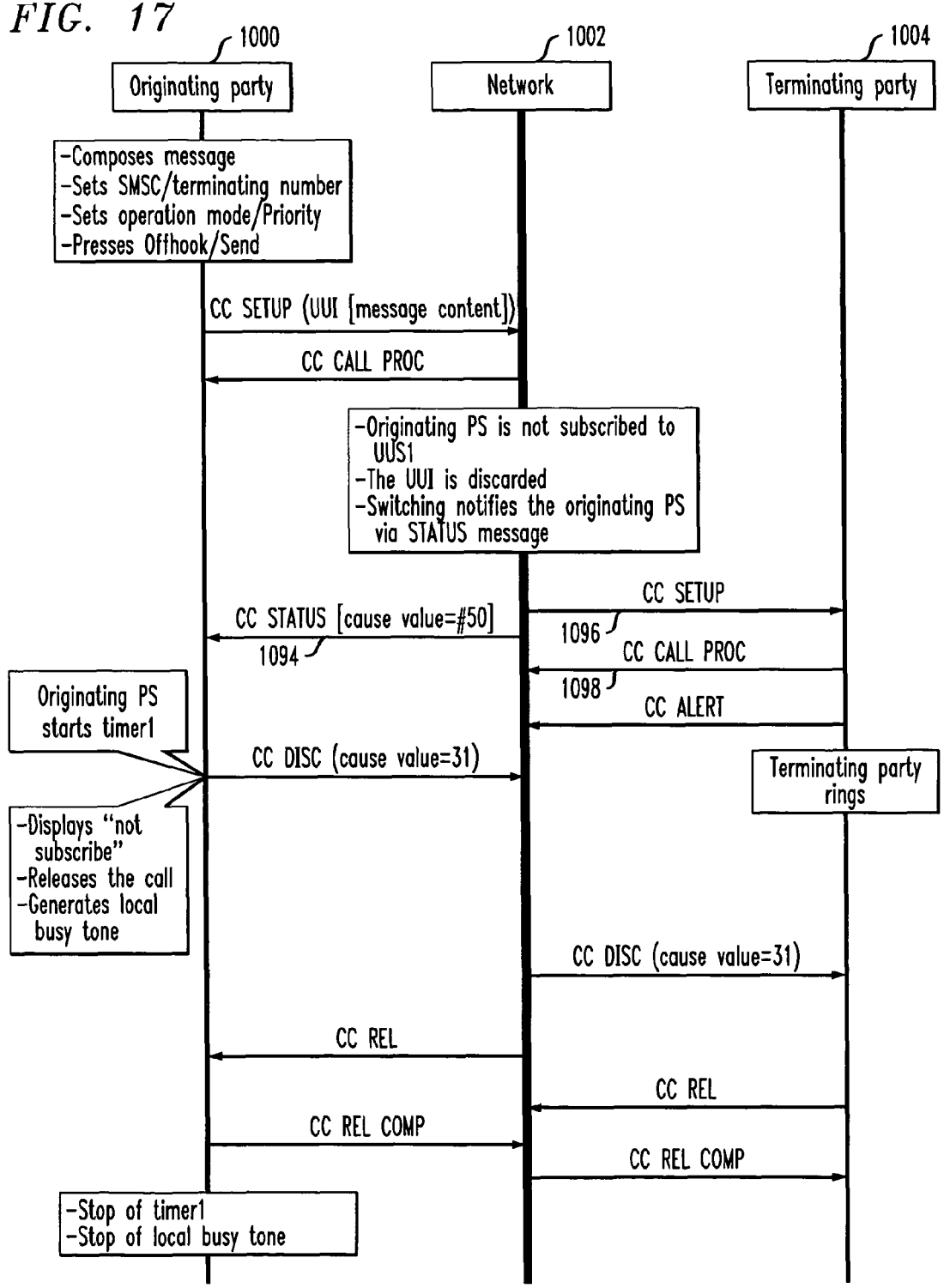
FIG. 17 illustrates a call-flow according to the present invention.

Referring to FIG. 17, if the originating party is not a subscriber to the selected user-to-user signaling service (UUS), then the network recognizes this fact, discards the messages, and notifies the originating party, as shown at 1094. In the meantime, the call is set-up by the terminating party as shown at 1096, 1098, and the terminating party phone may ring. However, in the meantime, the originating party, once it receives the notice of UUI discarded with the appropriate cause in the STATUS message, seeks to disconnect and release the call as previously described. It should be noted that the network, as shown at 1094, provides a cause value of 50 (requested facility not subscribed) to the originating party in the STATUS message. Further, the originating party provides a cause value of 31 (normal unspecified) to the network and the terminating party during the disconnect process.

Figure 18:
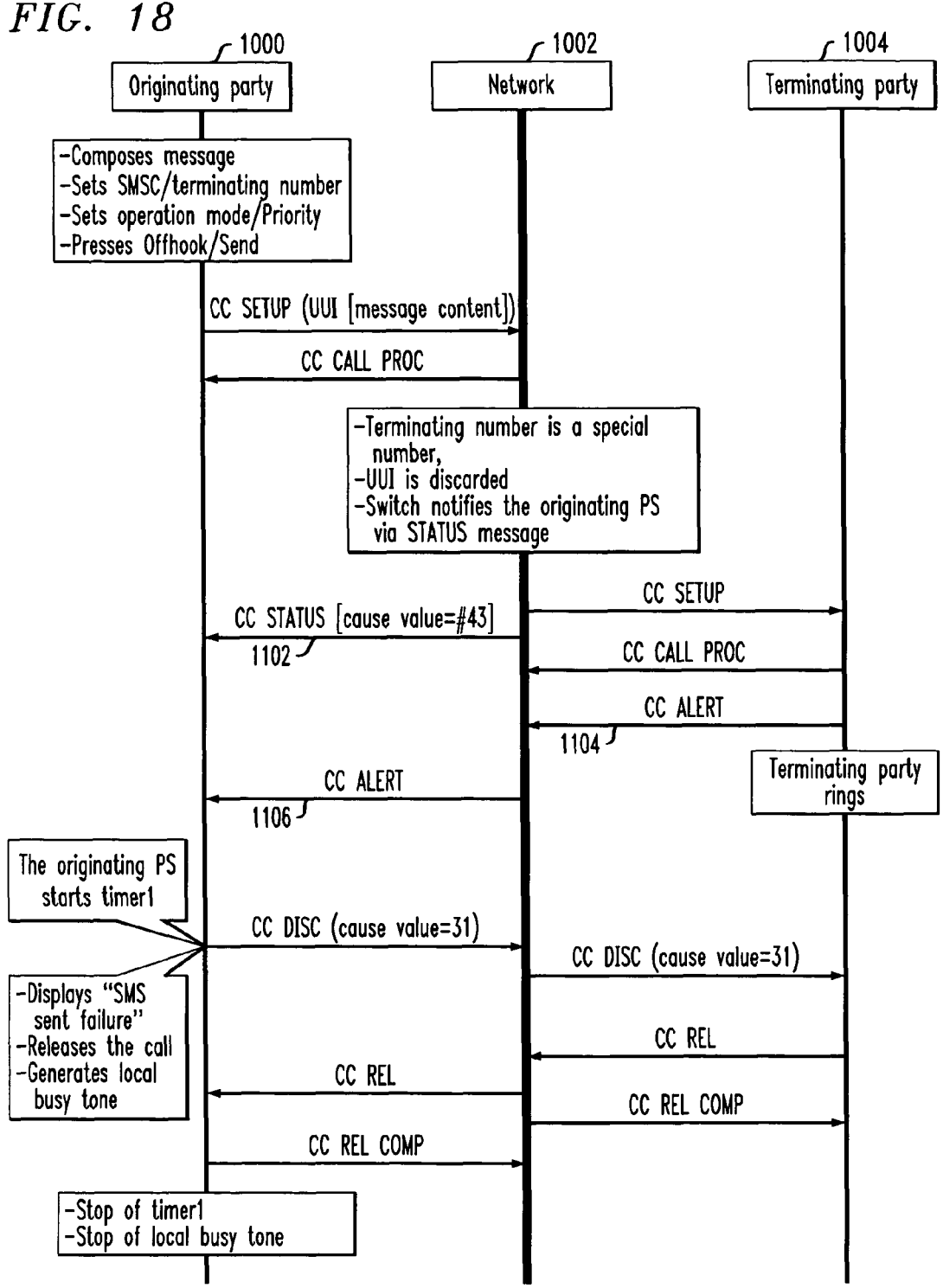
FIG. 18 illustrates a call-flow according to the present invention.

Referring now to FIG. 18, a situation where a terminating party number is a special number is addressed. In this case, the originating party 1000 sends a message to the network 1002. It is a network that identifies that the terminating number is a special number and discards the message. A similar process to that described in FIG. 13 is then followed to disconnect and release the call. Notably, the network sends a status message with a cause value 43 (access information discarded) to the originating party, as shown at 1102. However, the network simultaneously is attempting to set-up a call with a terminating party, without the UUI in the SET-UP message. The terminating party, realizing that a voice call connection is requested (not a short message call), sends alert, at 1104 and 1106, to the originating party. The originating party then seeks to release the call as previously described, using a cause value of 31 (normal call clearing, unspecified).

Figure 19:
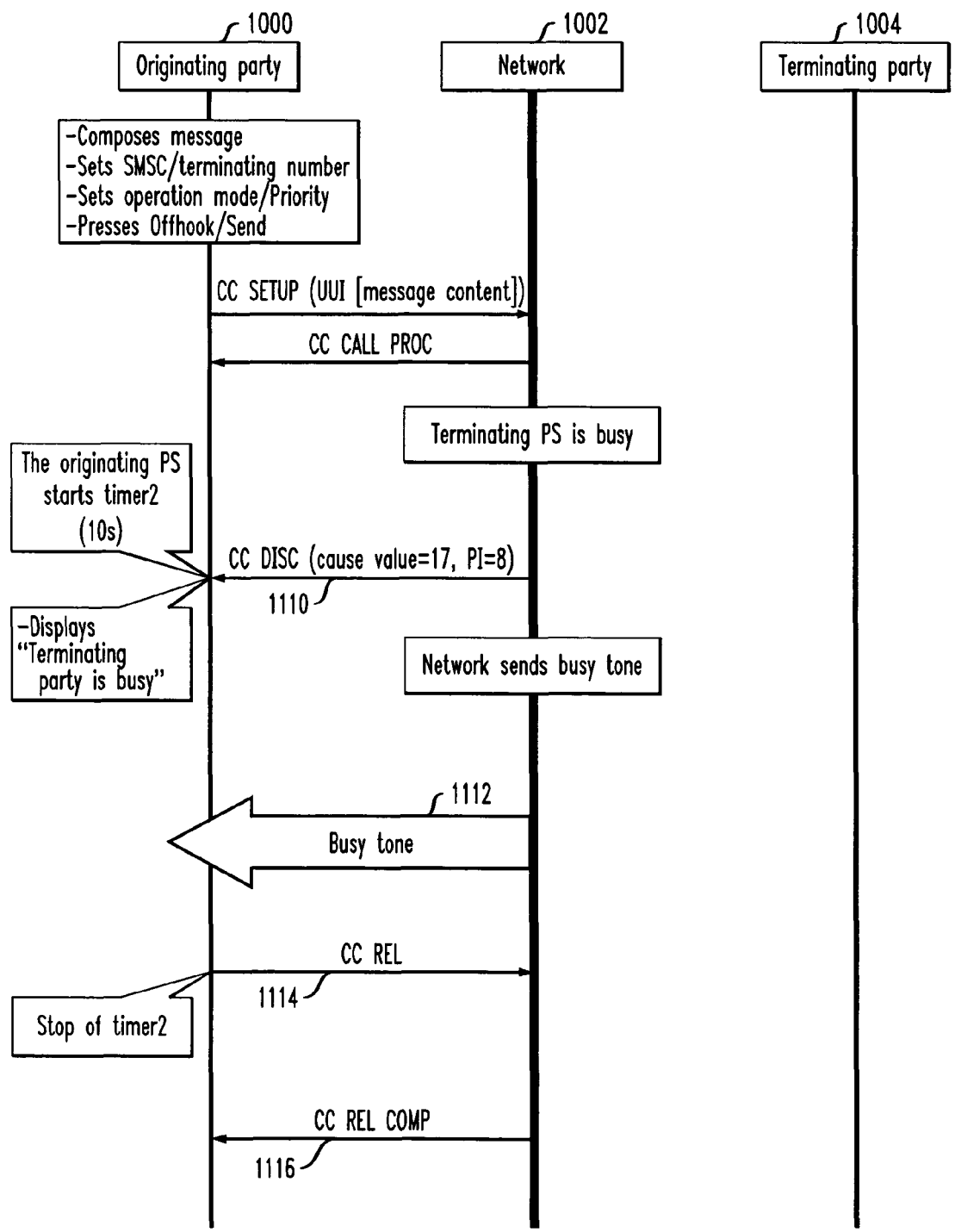
FIG. 19 illustrates a call-flow according to the present invention.
Figure 20:
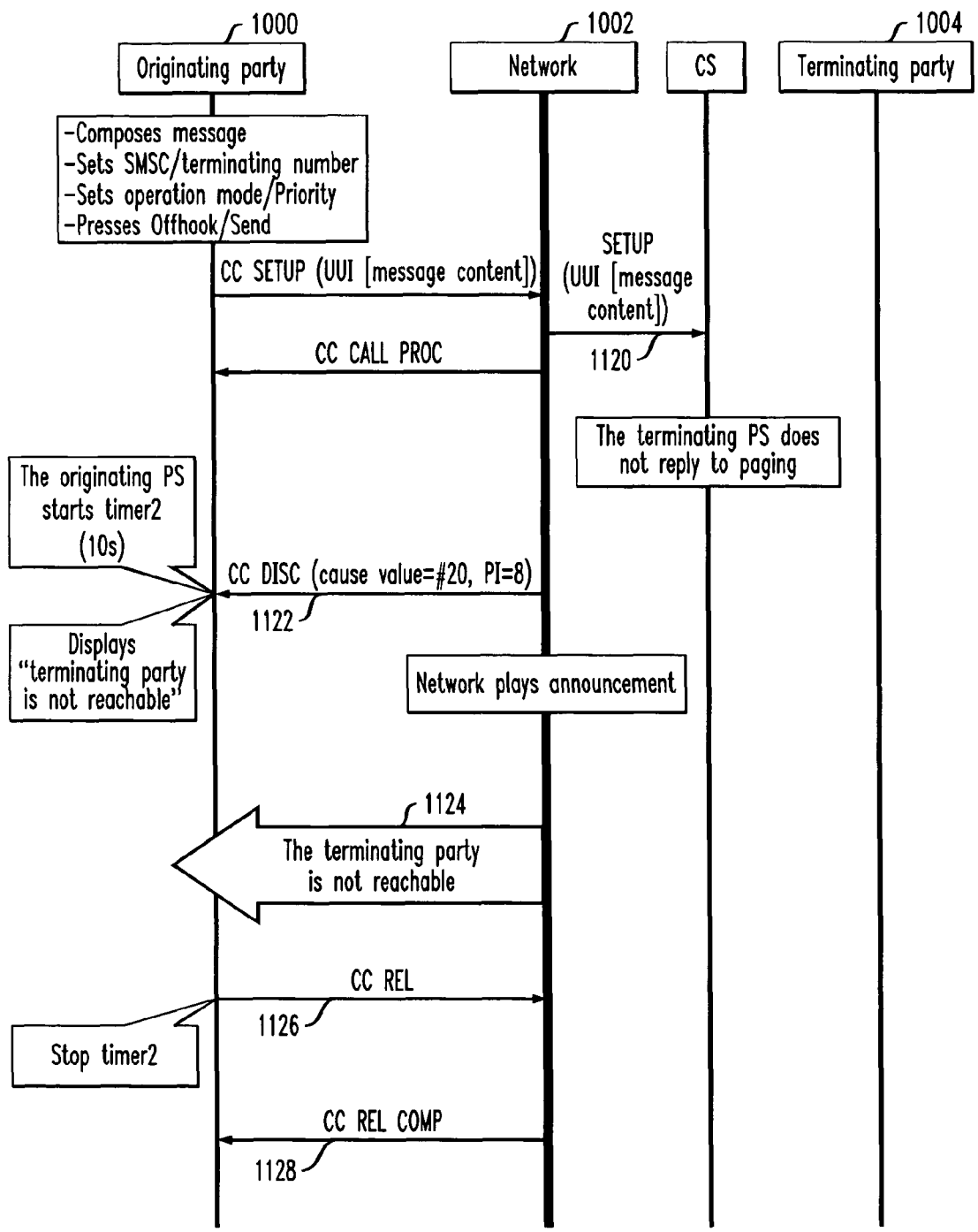
FIG. 20 illustrates a call-flow according to the present invention.

Referring now to FIG. 19, a situation where a terminating party is busy is addressed. In this case, the originating party 1000 sends a message to the network and the network determines that the terminating party is busy. In this situation, the network sends a disconnect message with a cause value of 17 (user busy) to the originating party, as shown at 1110. The network also sends a busy tone to the originating party, as shown at 1112. The originating party then releases the call as shown at 1114 and 1116.

There are times when a cellular phone, while not busy, may still be inaccessible to a calling party because its power is off or it is out of a service area. In this situation, the originating switch will send a disconnect message to the originating party. As shown in the call-flow of FIG. 20, the originating party sends a SET-UP message including UUI through the network and the network attempts to set-up a call with a terminating party, as shown at 1120. If the terminating party is not reachable, the network requests a disconnect (providing a cause value of 20 (subscriber absent)) of the call to the originating party as shown at 1122. The network also plays an announcement to the originating party that the terminating party is not reachable, as shown at 1124. The call is then released, as shown at 1126 and 1128.

Figure 21:
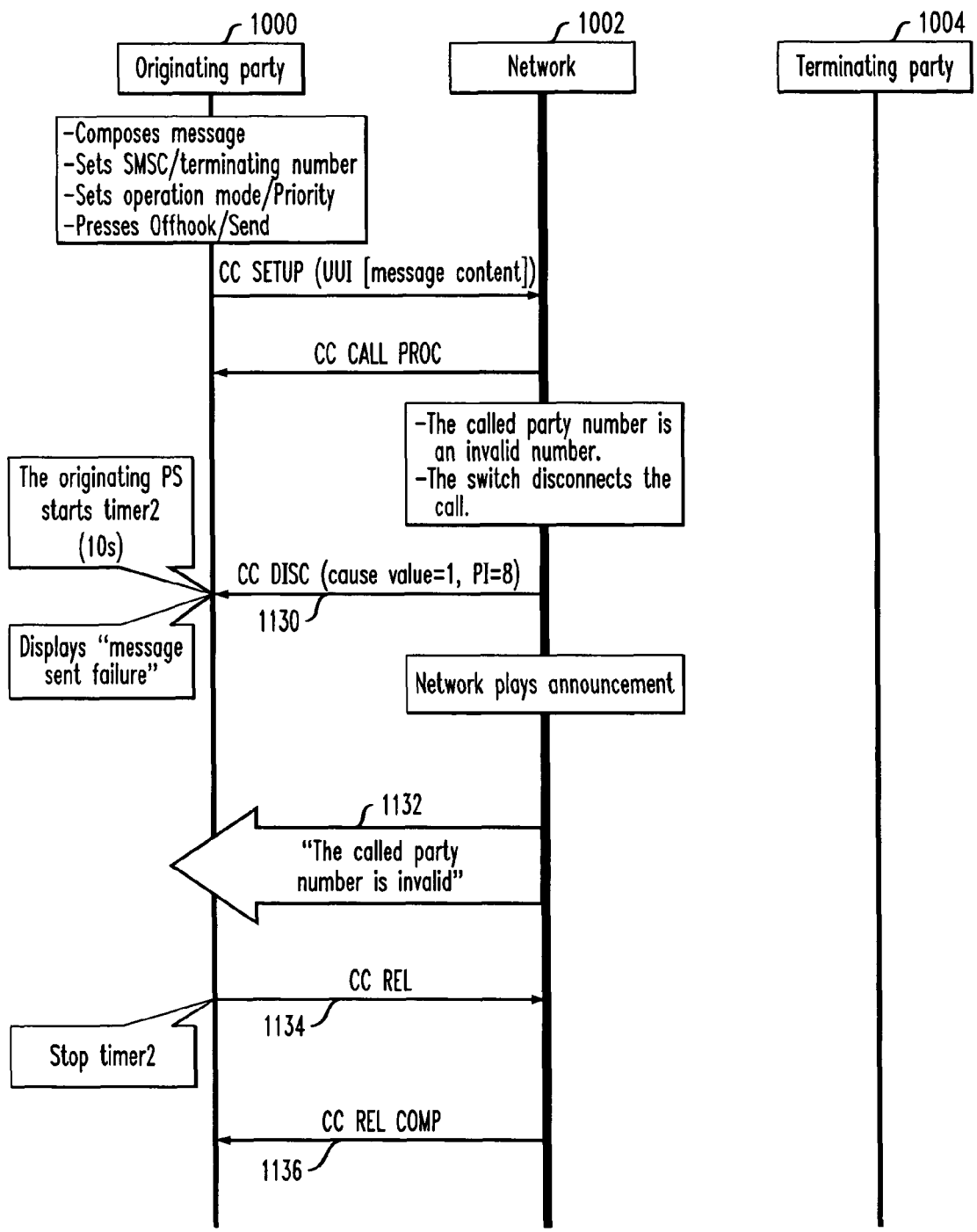
FIG. 21 illustrates a call-flow according to the present invention.

If the terminating party number is an invalid number, the network makes this determination and seeks to disconnect the call. As shown in FIG. 21, the originating party 1000 sends its message to the network and the networks requests that the call be discontinued (providing a cause value of 1 (unallocated (unassigned) number)), as shown at 1130, and plays an announcement to the originating party that the called party number is invalid, as shown at 1132. The call is then released, as shown at 1134 and 1136.

Figure 22:
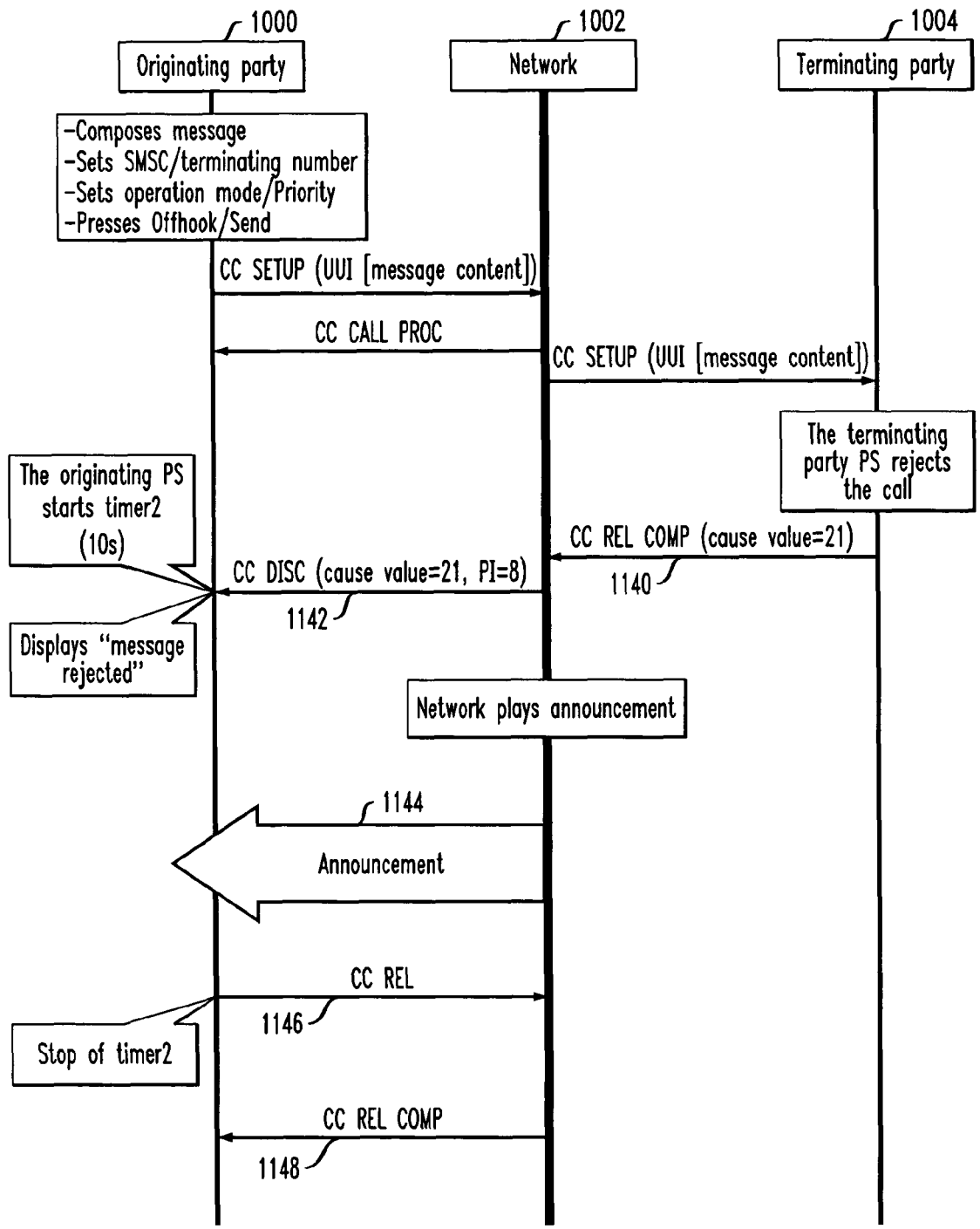
FIG. 22 illustrates a call-flow according to the present invention.

FIG. 22 illustrates a call-flow in a situation where a terminating party rejects the call. In this case, the originating party 1000 sends a SET-UP message including UUI to the network to the terminating party. The terminating party, however, rejects the call and sends a release message to the network with a cause value of 21, meaning that the call is rejected, as shown at 1140. The network then sends a disconnect message to the originating party, as shown at 1142, and plays an announcement to the originating party that the call was rejected, as shown at 1144. The call is then released, as shown at 1146 and 1148.

Figure 23:
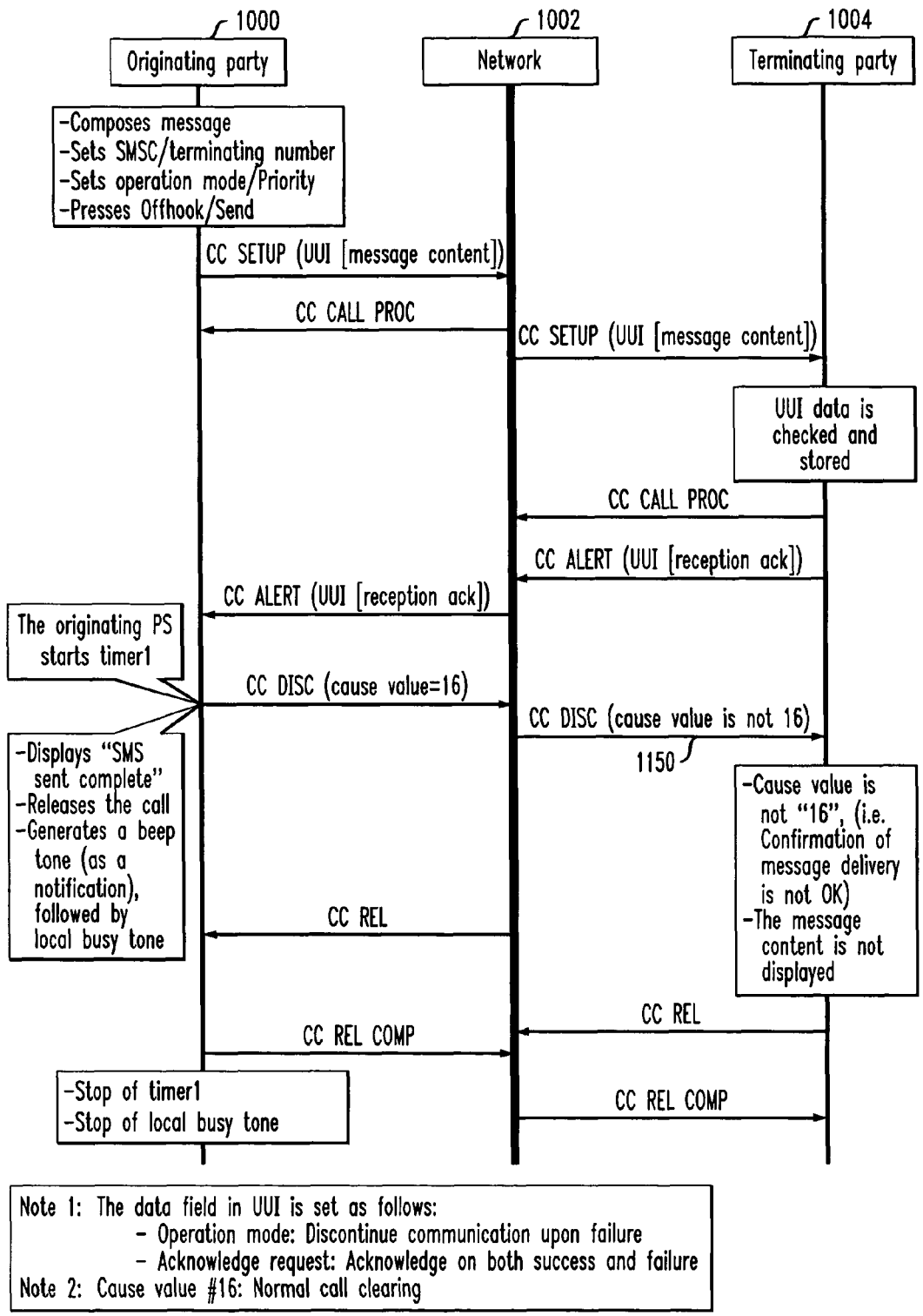
FIG. 23 illustrates a call-flow according to the present invention.

FIG. 23 illustrates a situation where the terminating party does not actually display the message content properly. In this situation, the originating party 1000 sends a message through the network 1002 to a terminating party 1004. The call-flow is then conducted in a manner identical to that of FIG. 10. However, the cause value in the DISC message is changed due to transmission error (or other reason), it is no longer the value of 16), as shown at 1150. The message sent to the terminating party is that the cause value is not 16 (normal call clearing). This action results in the originating party getting a charge for a call, however, the short message is not displayed on the terminating party's phone.

Figure 24:
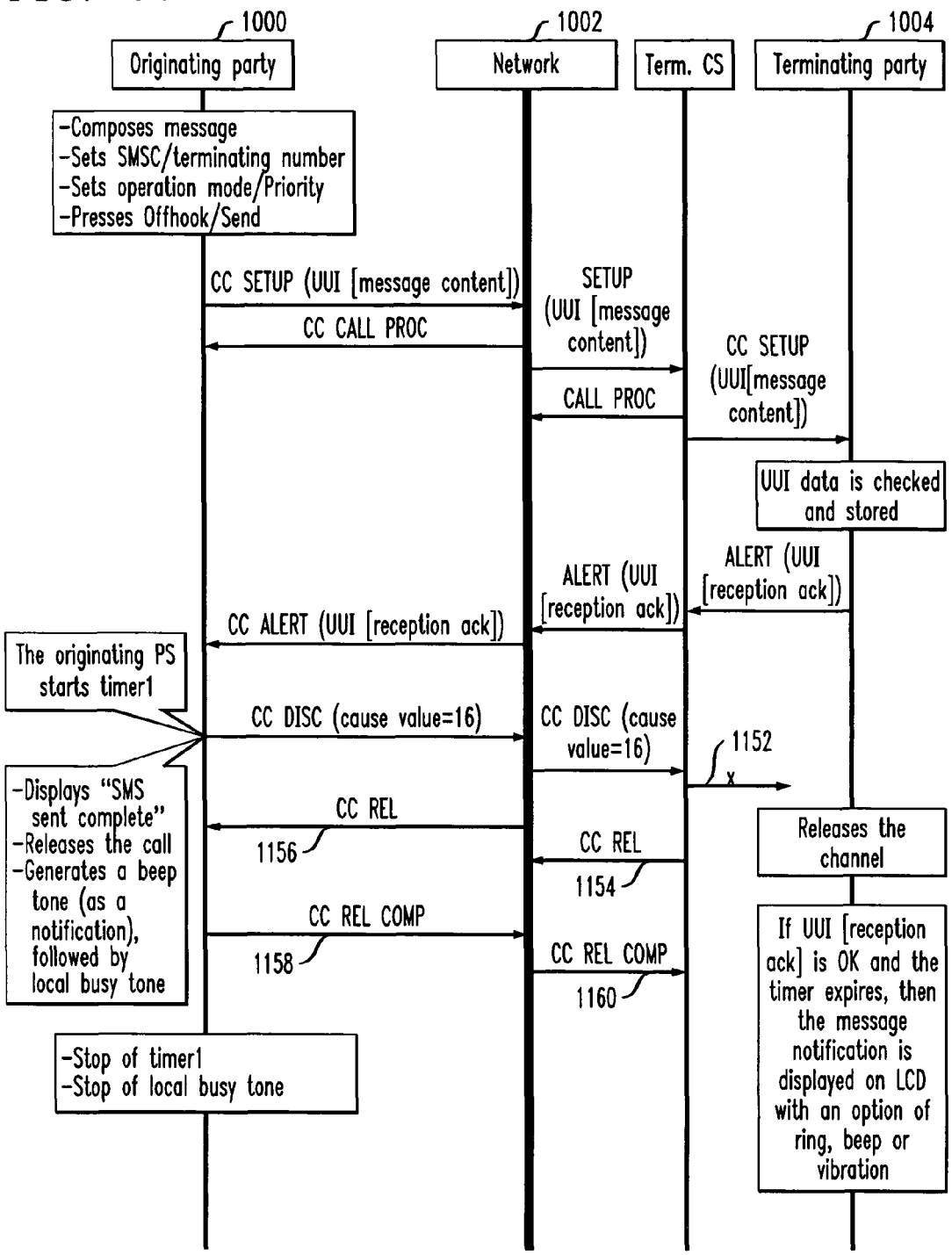
FIG. 24 illustrates a call-flow according to the present invention.

During a wireless call sequence, the possibility exists that the RF connection between the terminating party in the nearest cell station is deteriorated. Referring now to FIG. 24, these circumstances are addressed. Specifically, after an originating party 1000 sends a message through the network, the terminating cell station, and the proper acknowledgements are received back at the originating part, the opportunity for failure in the RF connection remains. For example, once the originating party seeks to disconnect and release the call, failure may nonetheless occur before the disconnect message reaches the terminating party such as at 1152. In this case, if the UUI reception acknowledge is OK, and the timer expires, then the message notification is nonetheless displayed on the screen. Thus, even though there is an RF deterioration, the message is nonetheless successfully received by the terminating party and the call is released, as shown at 1154, 1156, 1158, and 1160.

Figure 25:
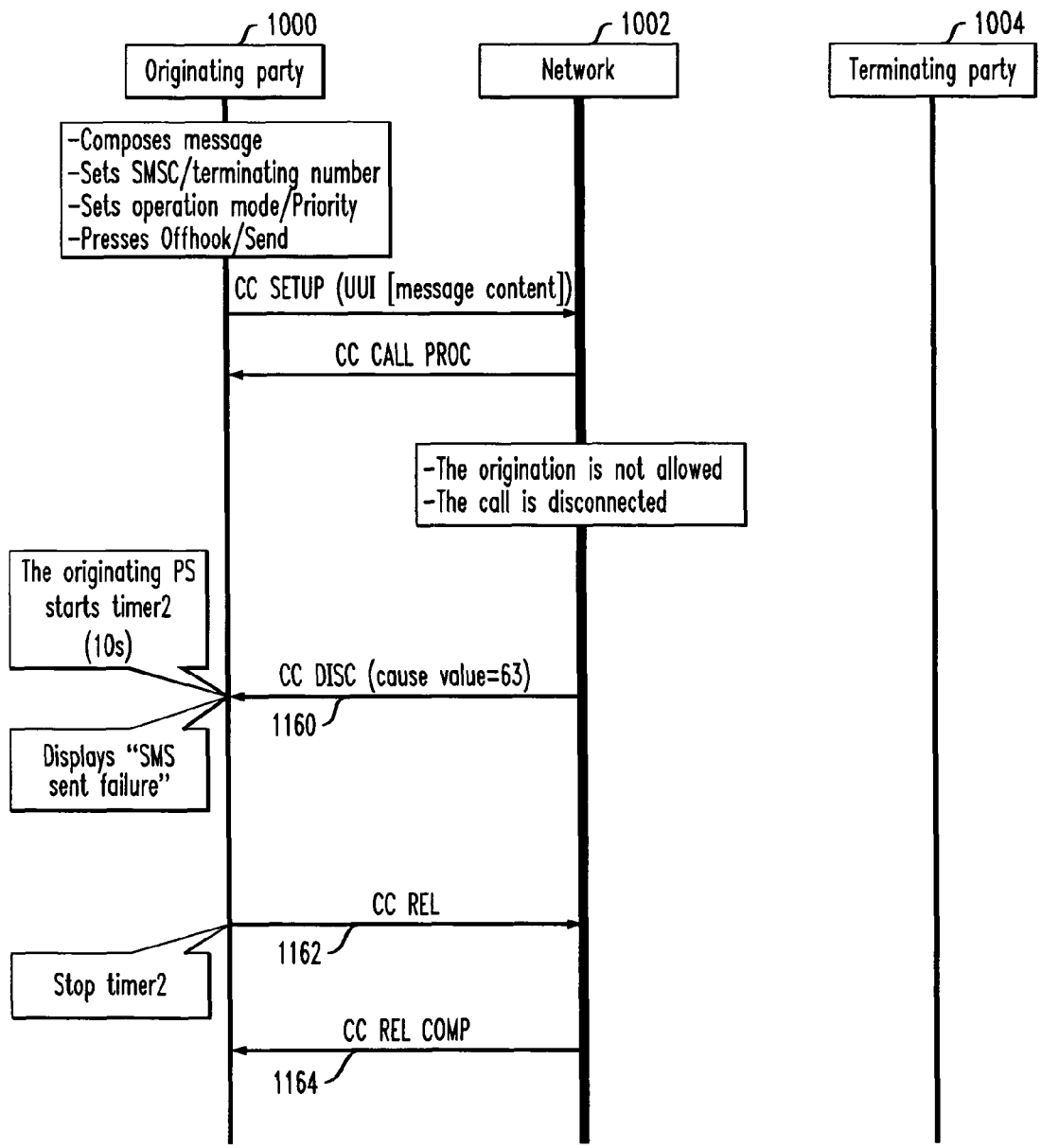
FIG. 25 illustrates a call-flow according to the present invention.

Referring now to FIG. 25, there are situations where origination of a call is simply not allowed by the network. In this case, after a message is attempted to be sent by an originating party 1000, the network determines that the call should be disconnected. As such, disconnect message is sent with a cause value of 63, meaning that service or option is not available, as shown at 1160. The call is then released as shown at 1162 and 1164.

Similarly, termination may not be allowed by the network because a service or option is not available to the terminating party. In this case, referring to FIG. 26, the originating party 1000 attempts to send a message. However, the network determines that the call is not allowed and disconnects the call, as shown at 1170, with a cause value of 63, meaning that service or option is not available. A busy tone is then provided to the originating party, as shown at 1172, and the call is ultimately released, shown at 1174 and 1176.

Figure 26:
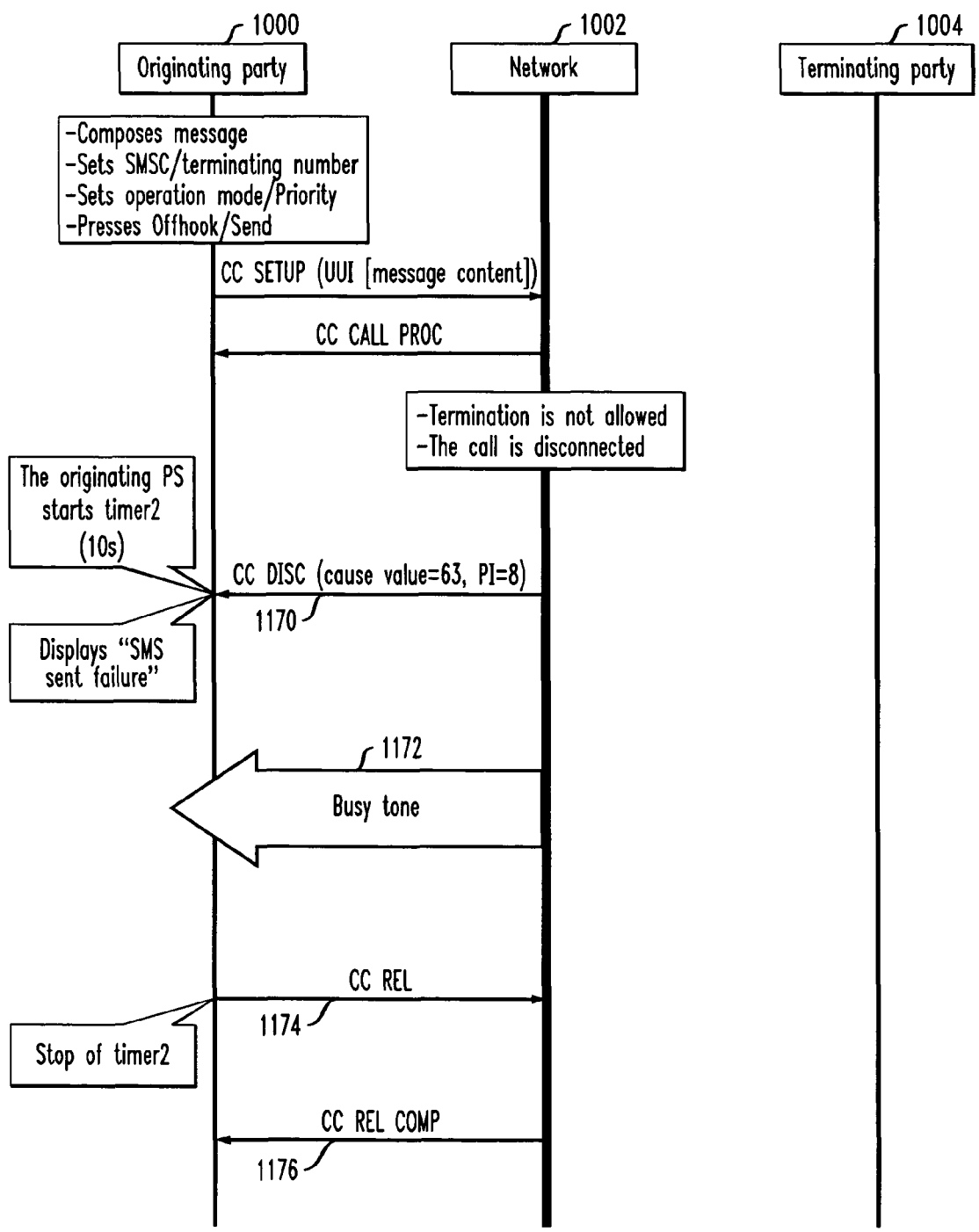
FIG. 26 illustrates a call-flow according to the present invention.
Figure 27:
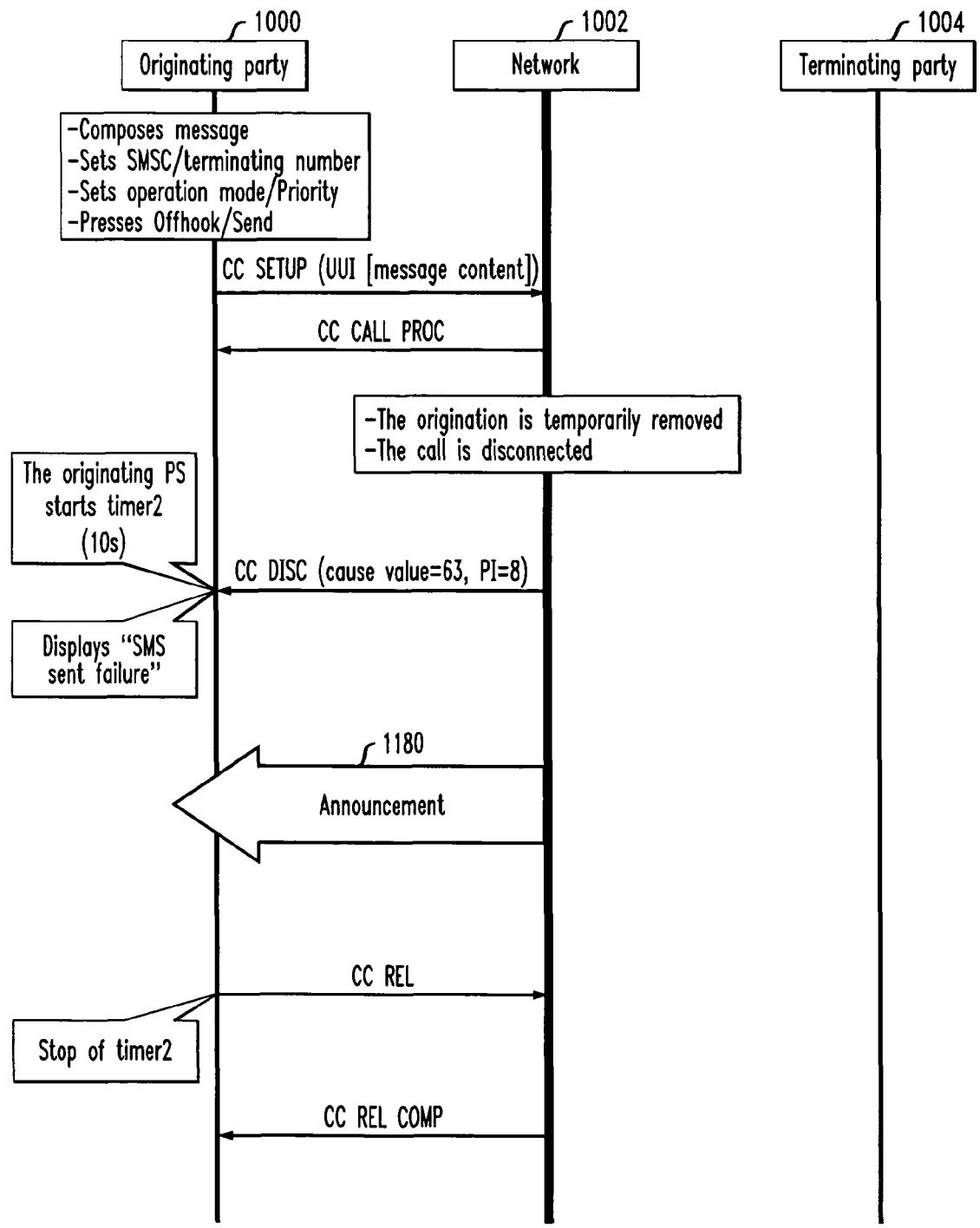
FIG. 27 illustrates a call-flow according to the present invention.

An origination may also be temporarily removed by the network. In this situation, the same process that is described in connection with FIG. 26 is followed. However, referring now to FIG. 27, an announcement is also provided to the originating party that indicates that service is not available, as shown at 1180.

Figure 28:
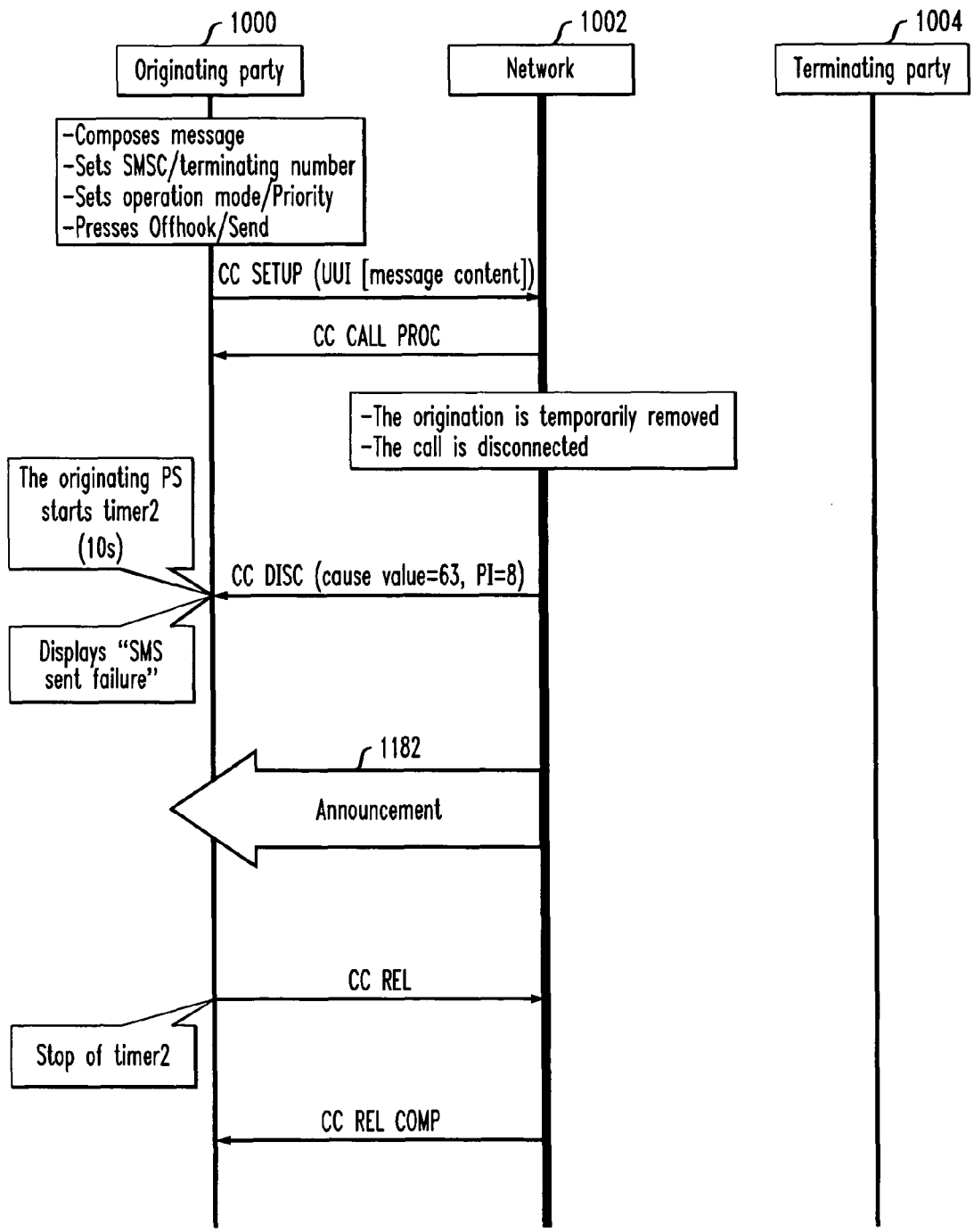
FIG. 28 illustrates a call-flow according to the present invention.

For a variety of reasons, the ability to terminate a call may be removed by the network. As shown in FIG. 28, the same process is accomplished as that in connection with FIG. 27, including an announcement, at 1182, indicating a termination capability is temporarily removed.

Figure 29:
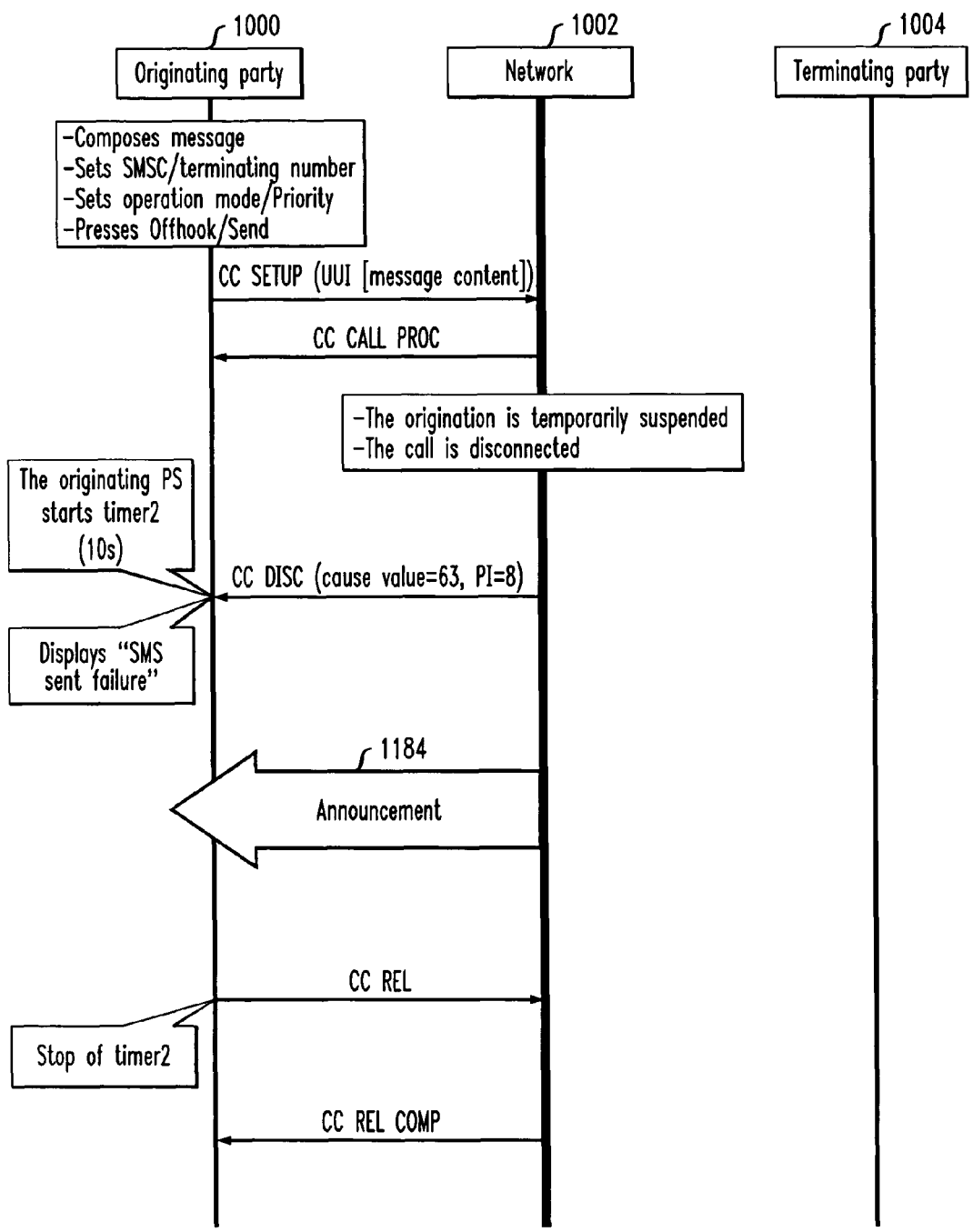
FIG. 29 illustrates a call-flow according to the present invention.

Similarly, origination may be temporarily suspended. Referring now to FIG. 29, when this occurs, it should be noted that the process is similar to that described in connection with FIGS. 27 and 28, whereby an announcement, shown at 1184, is provided to the originating party to indicate that origination is temporarily suspended in the network.

Figure 30:
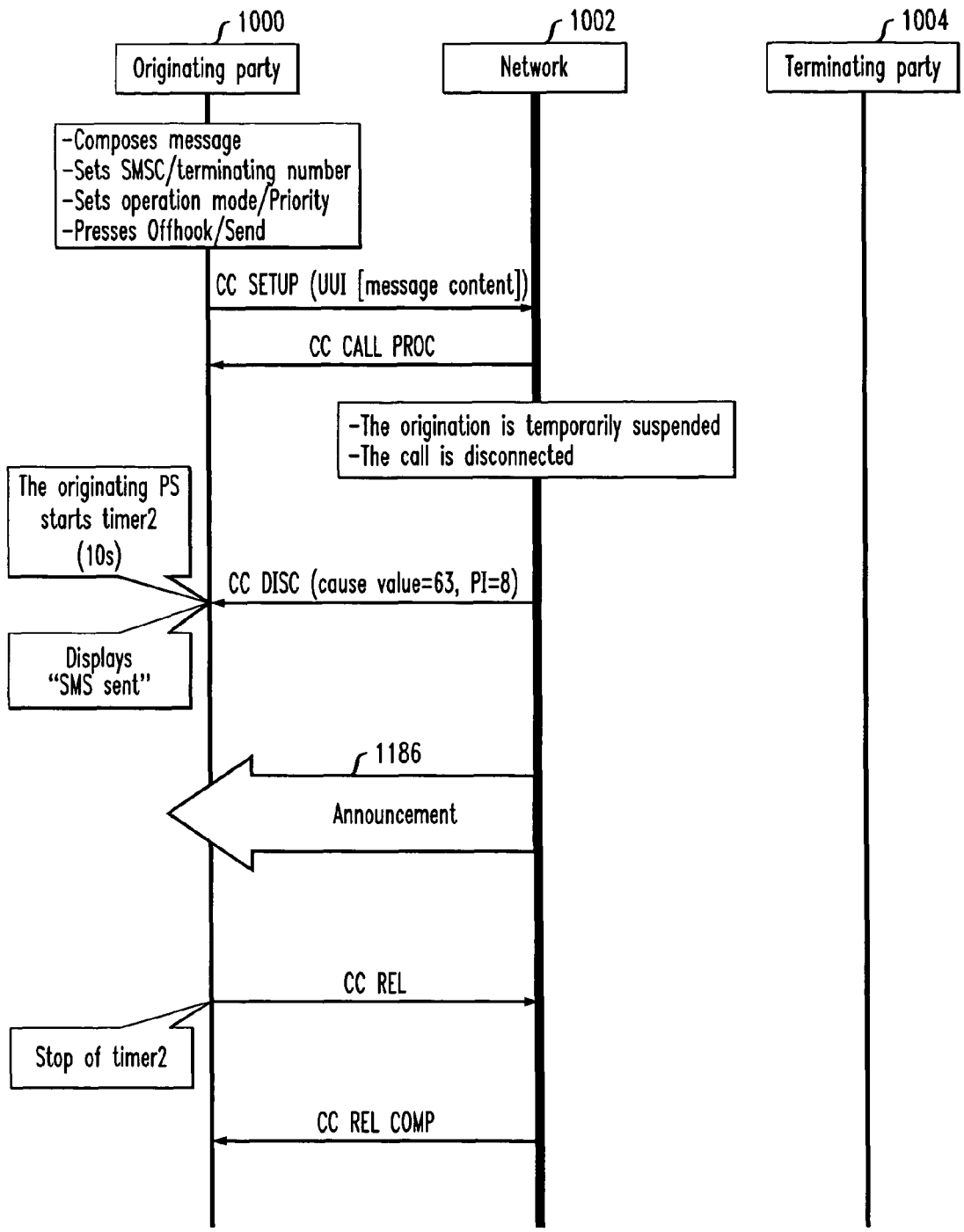
FIG. 30 illustrates a call-flow according to the present invention.

Likewise, the ability to terminate a call may be temporarily suspended. Referring now to FIG. 30, it should be apparent that the same process described in connection with FIGS. 27 though 29 is followed in this situation. An announcement 1186 is provided to the originating party indicating that termination capability is temporarily suspended in the network.

As noted above, if a short message is transmitted indirectly from one personal station to another personal station through a short message service center, then acknowledgements of receipt of the message is required when the personal station transmits the message to the short message center and when the short message center transmits the message to the second personal station. However, when the short message center notifies the first personal station that the message was successfully received by the second personal station, acknowledgement is not necessarily required, thus allowing for simple notification. Once notification is received by the originating party, the personal station may disconnect the call first or the network may disconnect the call first. Both of these situations are addressed in connection with FIGS. 31 and 32. It should be understood that for these circumstances, the operation mode (octet 7, bits 3-5) is set to "discontinue communication upon failure" and the acknowledge request (octet 6, bits 1-4) is set to "no acknowledge is required."

Figure 31:
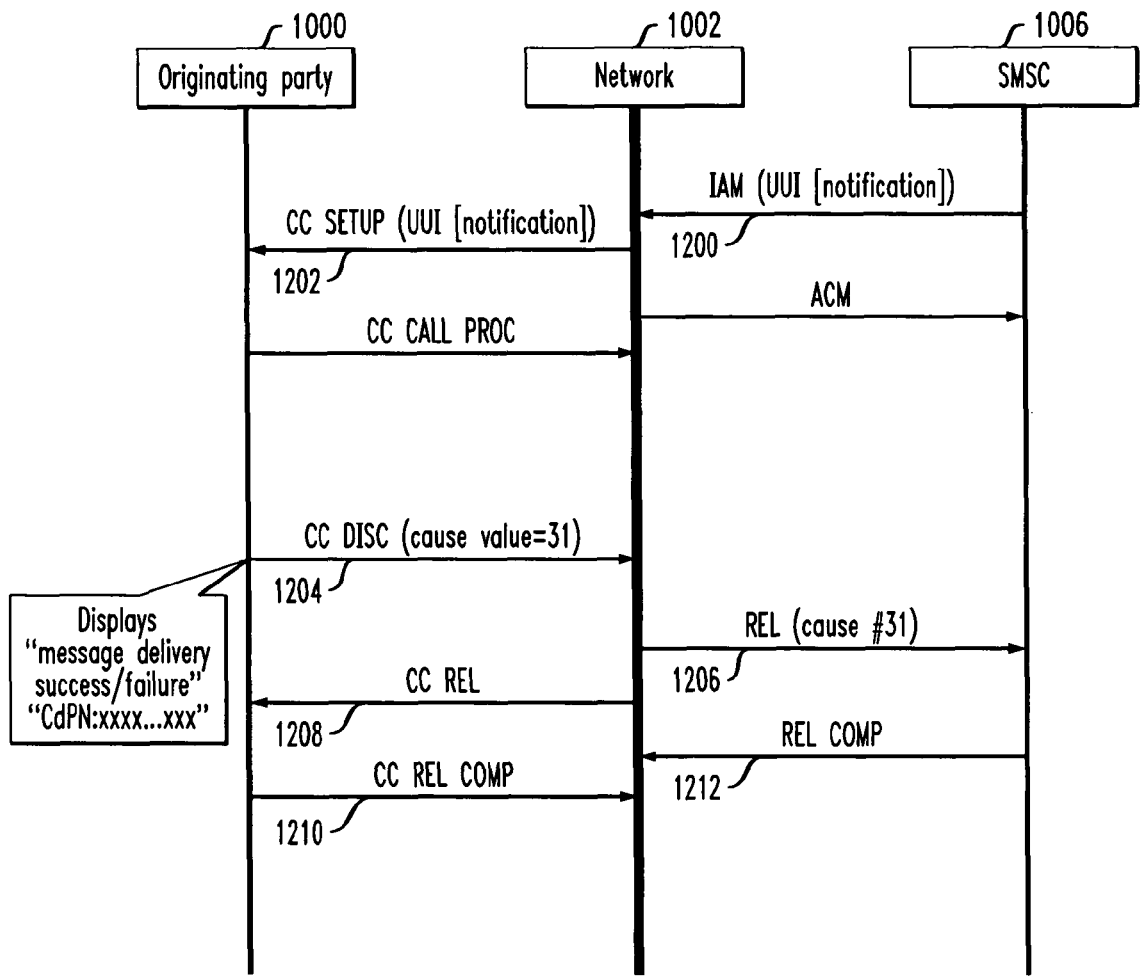
FIG. 31 illustrates a call-flow according to the present invention.

More particularly, referring now to FIG. 31, it can be seen that the notification of the status of message delivery is provided by the SMSC 1006 to the network 1002 which then forwards the notification on to the originating party 1000, as shown at 1200 and 1202. The originating party then disconnects and releases the call as shown at 1204, 1206. It should be appreciated that the disconnect based on the notification is provided with a cause value of 31, indicating that the originating party should not be charged for the notification. The call is then released as shown at 1208, 1210, and 1212.

Figure 32:
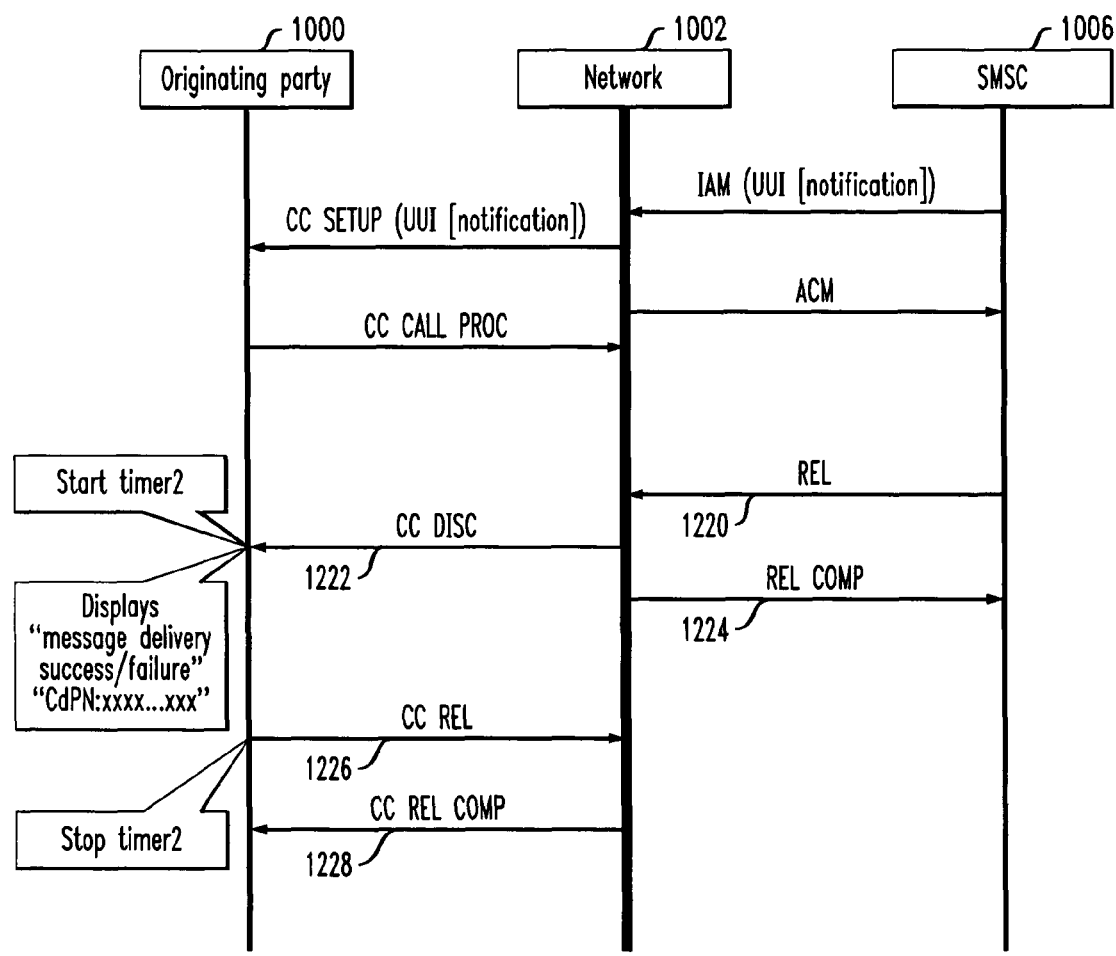
FIG. 32 illustrates a call-flow according to the present invention.

If the originating party 1000 receives the notification from the short message center and the network disconnects the call first, as shown in FIG. 32, the short message center requests release of the call, as shown at 1220, and the network sends a disconnect message to the originating party, as shown at 1222, and also completes the release of the call with the switching center, at 1224. The call between the originating party and the network is then appropriately released, as shown at 1226 and 1228.

Users of selected short message service, namely the SMS-based information services referenced above and described in greater detail below, provided by the present invention have a number of options available with respect to acknowledgement requests. More particularly, in addition to requesting "acknowledgement on both success and failure" and "no acknowledge" (as described previously), the originating party may request acknowledgement on failure or may request acknowledgement only on success. In any of these situations, at least two options exist. For example, if an originating party requests acknowledgement only on failure (by setting acknowledgement request to "acknowledge required on failure (not required on success)"), the system may provide no acknowledgement on success or acknowledgement on failure. However, if the originating party requests acknowledgement only on success (by setting acknowledgement request to "acknowledge required on success (not required on failure)"), it may do so by providing no acknowledgement on failure, or acknowledgement on success. It should be understood that the following call flows of FIGS. 33-36 have the operation mode set to "discontinue communication upon failure."

It should be understood that the call flow of FIG. 10 (acknowledge request on both success and failure) and the call flow of FIG. 31 or 32 (no acknowledge is required) can also be utilized for information retrieval and/or information broadcasting. An example of information query is:

step 1: a PS sends an information query via SMSC (see FIG. 10)
 the PS sends a SETUP message including the information query in UUI to SMSC
 the SMSC sends the reception acknowledge in UUI to the PS
 the PS releases the call
step 2: SMC retrieves the requested information from an appropriate information server step 3: SMSC sends the requested information to the PS by following FIG. 10 call flow or FIG. 31 (or FIG. 32) call follow based on the nature of information service.

An information broadcasting call flow would be similar but, depending on the nature of the broadcasting, acknowledgement may or may not be required.

Figure 33:
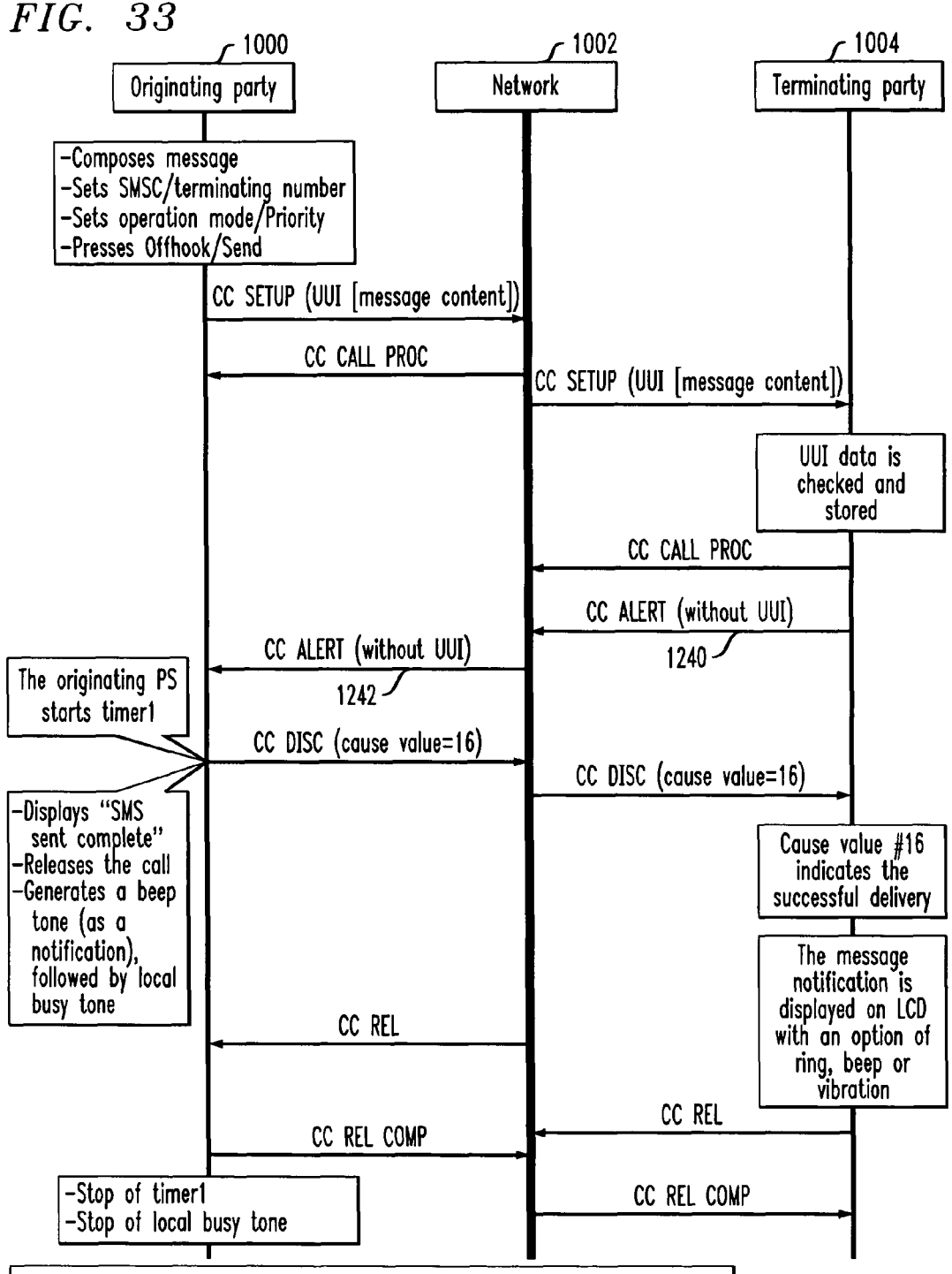
FIG. 33 illustrates a call-flow according to the present invention.

FIG. 33 illustrates a call-flow in the situation where the originating party requests acknowledgement on failure, and such messaging is accomplished by providing no acknowledgement on success. More particularly, the originating party 1000 sends a message through the network to the terminating party 1004. Instead of sending a reception acknowledge message back through the network to the originating party 1000, the terminating party simply sends an ALERT message without UUI content to the originating party, as shown at 1240 and 1242. This indicates to the originating party that the call was successful and the originating party proceeds to appropriately disconnect (cause value 16 (normal call clearing))and release the call, as described in connection with FIG. 10.

Figure 34:
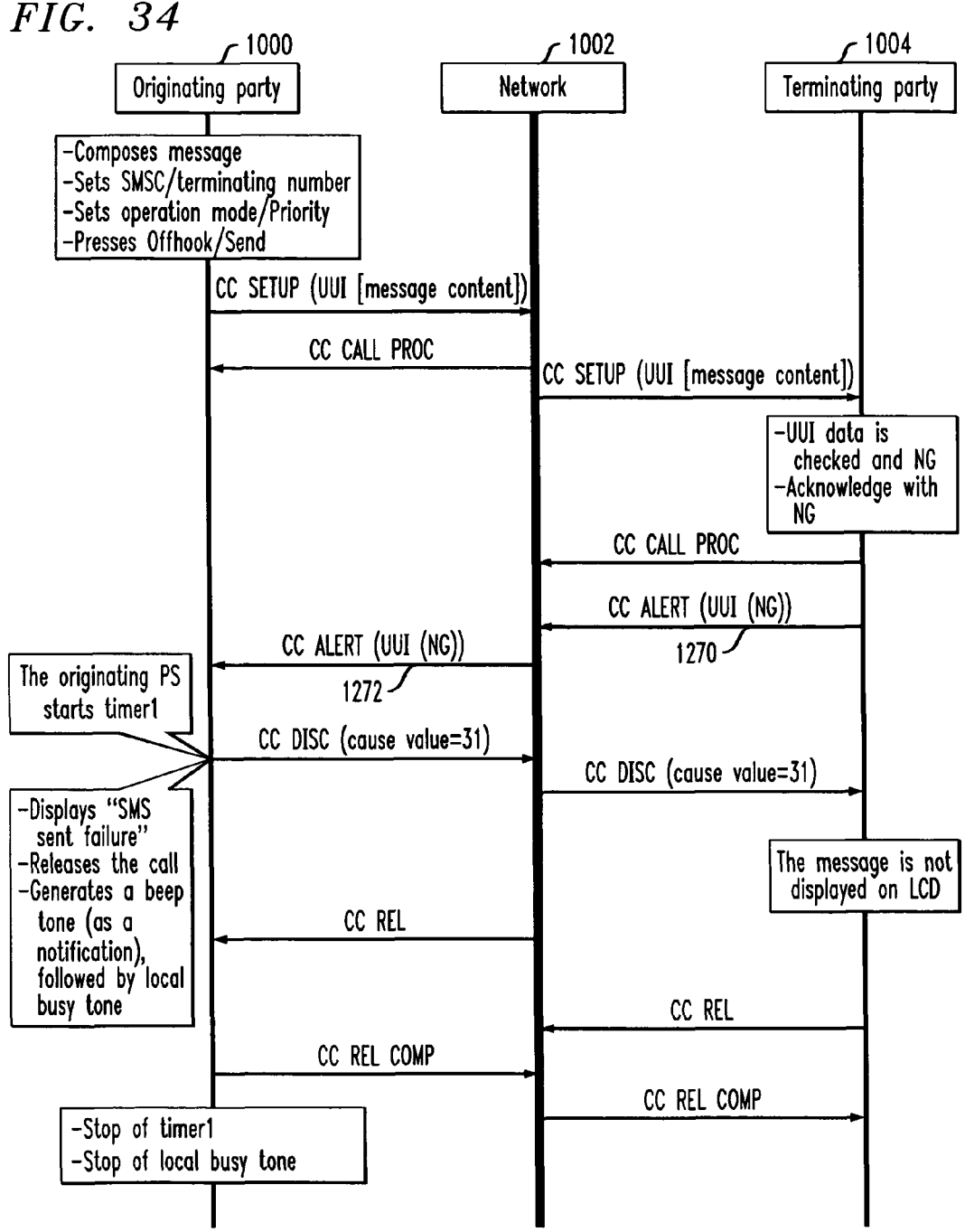
FIG. 34 illustrates a call-flow according to the present invention.

Referring now to FIG. 34, if a party requests acknowledgement on failure, once the terminating party 1004 determines that the UUI data is no good, or NG, an ALERT message including UUI with an NG indication is sent to the originating party through the network, as shown at 1270 and 1272. The originating party then disconnects (cause value 31 (normal call clearing, unspecified)) and releases the call in a manner similar to the process described in connection with FIG. 12.

Figure 35:
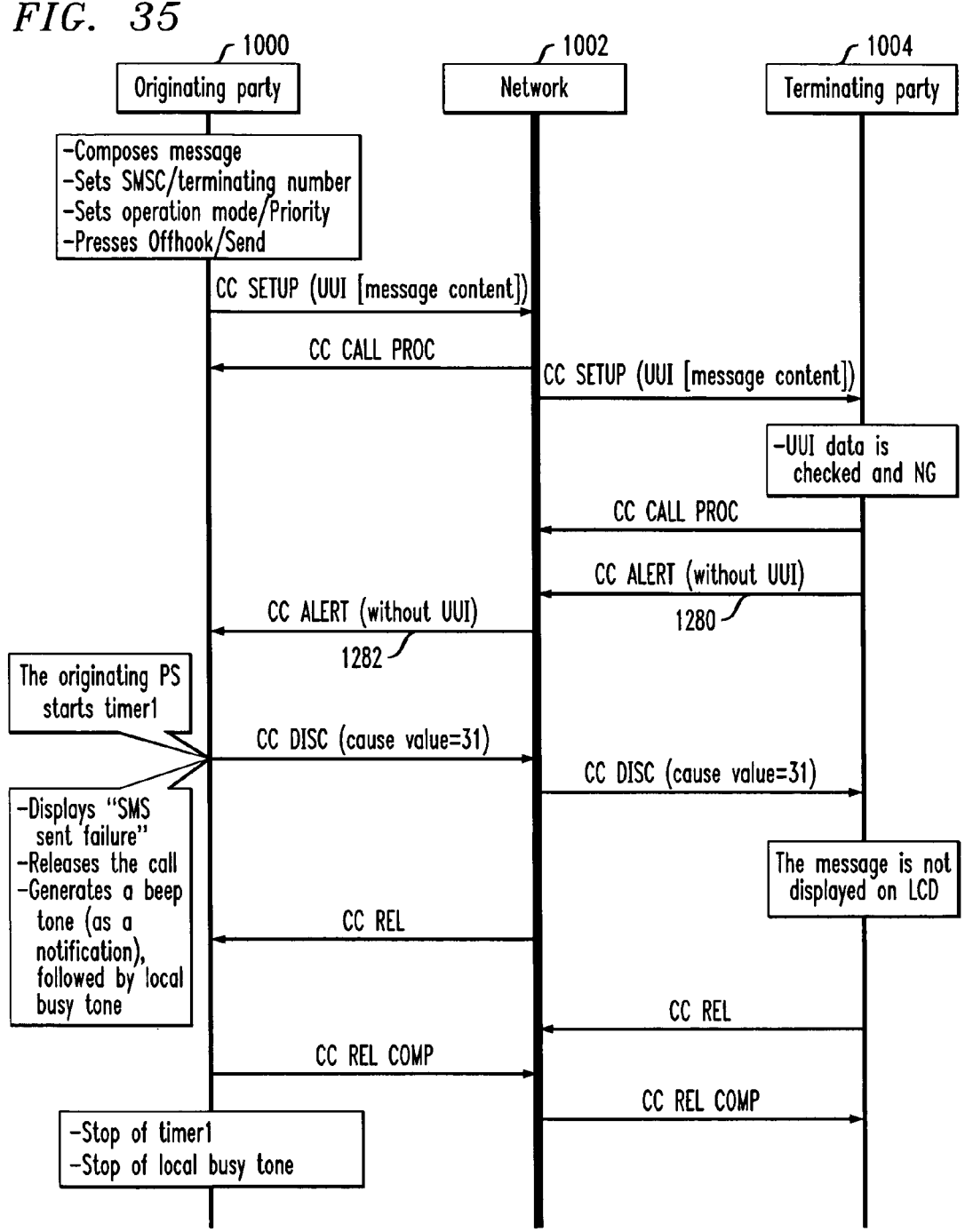
FIG. 35 illustrates a call-flow according to the present invention.

If the originating party requests acknowledgement on success, and that success is indicated to the originating party by no acknowledgement on failure, then the call-flow of FIG. 35 is followed. In this regard, once the terminating party 1004 determines that the UUI data is no good, or NG, an ALERT message is sent by the terminating party through the network to the originating party without UUI content, as shown at 1280 and 1282. This indicates to the originating party that there was a failure because it did not receive proper acknowledgement. The process for disconnection (cause value 31 (normal call clearing, unspecified)) and release of the call, similar to that in FIG. 34, is then followed.

Figure 36:
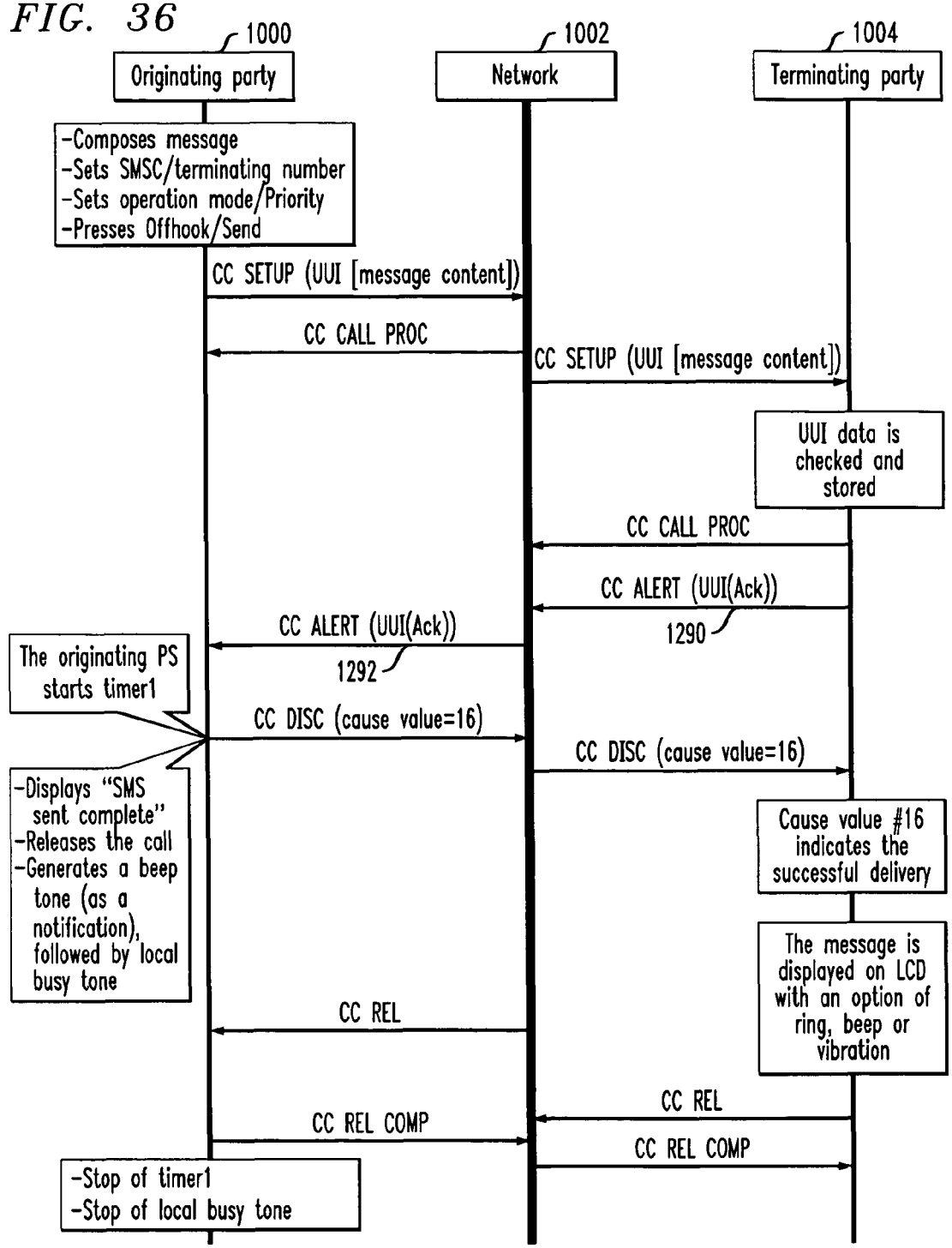
FIG. 36 illustrates a call-flow according to the present invention.

Referring to FIG. 36, if an originating party requests acknowledgement on success, the terminating party 1004, once it determines that the UUI data is checked and stored, sends an ALERT message to the originating party with an acknowledgement therein, as shown at 1290 and 1292. This is an indication to the originating party that the message was successfully received. As such, the disconnect (cause value 16 (normal call clearing)) and release steps, such as those of FIG. 33, are followed to disconnect and release the call.

An alternative network architecture according to the present invention is illustrated in FIG. 3. As shown, a network 200 includes a personal station (PS) 202, and a personal station (PS) 204 connecting to cell stations 206 and 208 respectively. PCS 210 and PCS 212 are also included in the network. As with the network shown in FIG. 2, a PCS, such as that shown at 210, is connected to a short message center 214. A short message center is in turn connected to an IP network 216 which connects to a plurality of information servers 218.

This alternative network structure is advantageously applied to the provision of short message service based information service networks. In this regard, short messaging can be used by a user to access various information from a variety of sources and to receive broadcast information. In this regard, the basic call-flows described above can be adapted to accommodate these features. For example, a user can submit an information query in the form of a short message. In this way, the subscriber could query an information server (e.g., stock, weather, sports, . . . etc.) via this short messaging center. The information server then sends a response back to the user via the short messaging center. Information servers can broadcast information via the short messaging center in a point-to-point fashion or a point-to-multipoint fashion.

The call-flows for a short messaging based information services, again, are similar to those for the short messaging described above. It simply depends on the setting of the control bytes in the UUI content (e.g., acknowledge request). The appropriate call scenarios can then be applied. For example, the query contemplated by the short messaging based information services is comparable to a PS-to-SMSC call-flow with acknowledgement on both success and failure. The response of the information servers is provided to the user from the SMSC via the response call-flow similar to that of the SMSC-to-PS call-flow. Of course, it should be appreciated that a variety of scenarios regarding an acknowledgement request could be used in this situation, i.e., acknowledgement on success, acknowledgement on failure, acknowledgement on both success and failure, or acknowledgement not required.

For an information broadcast, the SMSC to PS call-flow may be used. Again, the acknowledgement request values may vary.

In addition, it should be appreciated that the language encoding and input methods used in the implementation of the present invention may vary. This variation is dependent upon the network or system implemented and the country in which it is implemented. For example, if Chinese characters are used, such characters are preferably transmitted using GB2312-80 code. This code is used for short messages, phone number lists, address lists, guide help information, operation menu items, menu items of web browsing software, and other items that may require display. Chinese character input methods may well be governed by a standard such as GB/T18031-2000 (General Requirement of Chinese Character Input Method for Using Digital Keypad and Information Technology).

In one embodiment, the character transmission of messages is accomplished in GB2312 and IA5. The user is preferably able to display Chinese and English.

The above description merely provides a disclosure of particular embodiments of the invention and is not intended for the purpose of limiting the same thereto. As such, the invention is not limited to only the above-described embodiments. Rather, it is recognized that one skilled in the art could conceive alternative embodiments that follow within the scope of the invention.

I claim:

1. A method for supporting a short-messaging call in a communication network, the method comprising steps of:
    determining, based on the value of a called party number indicator bit set by a caller, whether a short message will be sent on a first communication path from a first personal station to a second personal station directly through the communication network or on a second communication path from the first personal station to the second personal station through a short message center within the communication network;
    based on the determining, performing at least one of
    1(a) transmitting the short message on the first communication path from the first personal station;
    1(b) acknowledging receipt of the short message by the second personal station;
    1(c) releasing the call by the first personal station based on the acknowledging; and
    2(a) transmitting the short message on the second communication path from the first personal station;
    2(b) acknowledging receipt of the short message by the short message center;
    2(c) releasing the call by the first personal station;
    2(d) transmitting the short message on the second communication path from the short message center;
    2(e) acknowledging receipt of the short message by the second personal station;
    2(f) releasing the call by the short message center;
    2(g) notifying the first personal station by the short message center of the receipt of the short message by the second personal station;
    2(h) releasing the call by the short message center or the first personal station.

2. The method as set forth in claim 1 further comprising generating the short message within a User-to-User information (UUI) element.

3. The method as set forth in claim 2 further comprising selectively providing at least one of a first number corresponding to the first personal station and a second number corresponding to the second personal station in the UUI element when the short message is transmitted over the second communication path.

4. A method for supporting a short-messaging call in a communication network, the method comprising steps of:
    determining that a short message will be sent on a communication path from a first personal station to a second personal station through a short message center within the communication network, wherein the determining is based on the value of a called party number indicator bit set by a caller;
    transmitting the short message on the communication path from the first personal station;
    acknowledging receipt of the short message by the short message center;
    releasing the call by the first personal station;
    transmitting the short message on the communication path from the short message center;
    acknowledging receipt of the short message by the second personal station;
    releasing the call by the short message center;
    notifying the first personal station by the short message center of the receipt of the short message by the second personal station; and
    releasing the call by the short message center or the first personal station.

5. The method as set forth in claim 4 further comprising generating the short message within a User-to-User information (UUI) element.

6. The method as set forth in claim 5 further comprising selectively providing at least one of a first number corresponding to the first personal station and a second number corresponding to the second personal station in the UUI element when the short message is transmitted over the second communication path.

7. A system for supporting a short-messaging call in a communication network, the system comprising:
    means for determining, based on the value of a called party number indicator bit set by a caller, whether a short message will be sent on a first communication path from a first personal station to a second personal station directly through the communication network or on a second communication path from the first personal station to the second personal station through a short message center within the communication network;
    means for performing, based on the determining, at least one of 1(a) transmitting the short message on the first communication path from the first personal station;
1(b) acknowledging receipt of the short message by the second personal station;
1(c) releasing the call by the first personal station based on the acknowledging; and
2(a) transmitting the short message on the second communication path from the first personal station;
2(b) acknowledging receipt of the short message by the short message center;
2(c) releasing the call by the first personal station;
2(d) transmitting the short message on the second communication path from the short message center;
2(e) acknowledging receipt of the short message by the second personal station;
2(f) releasing the call by the short message center;
2(g) notifying the first personal station by the short message center of the receipt of the short message by the second personal station;
2(h) releasing the call by the short message center or the first personal station.

8. The system as set forth in claim 7 wherein the short message is in User-to-User information (UUI) element format.

9. The system as set forth in claim 8 wherein the short message contains at least one of a first number corresponding to the first personal station and a second number corresponding to the second personal station in the UUI element.

10. A system for supporting a short-messaging call in a communication network, the system comprising:

means for determining that a short message will be sent on a communication path from a first personal station to a second personal station through a short message center within the communication network, wherein the determining is based on the value of a called party number indicator bit set by a caller;
means for transmitting the short message on the communication path from the first personal station;
means for acknowledging receipt of the short message by the short message center;
means for releasing the call by the first personal station;
means for transmitting the short message on the communication path from the short message center;
means for acknowledging receipt of the short message by the second personal station;
means for releasing the call by the short message center;
means for notifying the first personal station by the short message center of the receipt of the short message by the second personal station; and
means for releasing the call by the short message center or the first personal station based on the notifying.

11. The method as set forth in claim 10 wherein the short message is in User-to-User information (UUI) element format.

12. The system as set forth in claim 11 wherein the short message contains at least one of a first number corresponding to the first personal station and a second number corresponding to the second personal station in the UUI element.

* * * * *